US010934038B2

(12) United States Patent
Last

(10) Patent No.: US 10,934,038 B2
(45) Date of Patent: *Mar. 2, 2021

(54) POUCH COLLECTION ROBOT SYSTEM AND METHOD FOR THE ASSEMBLY AND COLLECTION OF NON-FILLED SPOUTED POUCHES

(71) Applicant: Scholle IPN IP BV, SX Tilburg (NL)

(72) Inventor: Laurens Last, Bosch en Duin (NL)

(73) Assignee: Scholle IPN IP BV, Tilburg (NL)

( * ) Notice: Subject to any disclaimer, the term of this patent is extended or adjusted under 35 U.S.C. 154(b) by 133 days.

This patent is subject to a terminal disclaimer.

(21) Appl. No.: 14/785,600

(22) PCT Filed: Apr. 18, 2014

(86) PCT No.: PCT/NL2014/050255
§ 371 (c)(1),
(2) Date: Oct. 19, 2015

(87) PCT Pub. No.: WO2014/171834
PCT Pub. Date: Oct. 23, 2014

(65) Prior Publication Data
US 2016/0107778 A1 Apr. 21, 2016

(30) Foreign Application Priority Data
Apr. 19, 2013 (WO) ................ PCT/NL2013/050297

(51) Int. Cl.
*B65B 43/12* (2006.01)
*B25J 15/00* (2006.01)
(Continued)

(52) U.S. Cl.
CPC ............... *B65B 43/12* (2013.01); *B25J 11/00* (2013.01); *B25J 15/0066* (2013.01); *B65B 5/06* (2013.01);
(Continued)

(58) Field of Classification Search
CPC .... B65G 47/907; B65G 47/905; B65G 57/00; B65G 37/00; Y10S 901/47; Y10S 901/02; B25J 15/0066; B25J 11/00; B65B 5/06; B65B 5/08; B65B 5/105; B65B 35/24; B65B 2220/16; B31B 70/92; B31B 70/98;
(Continued)

(56) References Cited

U.S. PATENT DOCUMENTS 3,596,430 A * 8/1971 Parish .................... B65B 43/465
206/499
4,415,085 A * 11/1983 Clarke ...................... A61J 1/05
206/526

(Continued)

*Primary Examiner* — Thomas M Wittenschlaeger
(74) *Attorney, Agent, or Firm* — The Watson IP Group, PLC; Jovan N. Jovanovic

(57) ABSTRACT

The present invention relates to a pouch collection robot system (1) and method for the collection of non-filled spouted pouches (10) to be transported to a remote filling device. According to the invention, at least one pick and place robot unit (25) with a gripping device (28) is provided to pick up a non-filled spouted pouch (10) from a conveyor (5), and to place the non-filled spouted pouch (10) into alignment with one of a multiple of storage rails (21), allowing the non-filled spouted pouch to be placed into the storage rail.

15 Claims, 18 Drawing Sheets

(51) Int. Cl.
| | |
|---|---|
| *B65B 5/08* | (2006.01) |
| *B65G 47/90* | (2006.01) |
| *B65B 43/44* | (2006.01) |
| *B65B 5/06* | (2006.01) |
| *B25J 11/00* | (2006.01) |
| *B65B 5/10* | (2006.01) |
| *B65B 35/24* | (2006.01) |
| *B65G 37/00* | (2006.01) |
| *B65G 57/00* | (2006.01) |
| *B65B 43/00* | (2006.01) |
| *B31B 70/92* | (2017.01) |
| *B31B 70/98* | (2017.01) |
| *B31B 70/84* | (2017.01) |

(52) U.S. Cl.
CPC ............... *B65B 5/08* (2013.01); *B65B 5/105* (2013.01); *B65B 35/24* (2013.01); *B65B 43/44* (2013.01); *B65G 37/00* (2013.01); *B65G 47/905* (2013.01); *B65G 47/907* (2013.01); *B65G 57/00* (2013.01); *B31B 70/844* (2017.08); *B31B 70/92* (2017.08); *B31B 70/98* (2017.08); *B65B 43/00* (2013.01); *B65B 2220/16* (2013.01); *Y10S 901/02* (2013.01); *Y10S 901/47* (2013.01)

(58) Field of Classification Search
CPC ....... B31B 70/844; B31B 43/12; B31B 43/00; B31B 43/44
See application file for complete search history.

(56) References Cited

U.S. PATENT DOCUMENTS

| | | | |
|---|---|---|---|
| 5,175,014 A * | 12/1992 | Brockwell | A01J 25/162 426/512 |
| 6,575,289 B2 * | 6/2003 | Hiramoto | B65B 43/14 198/433 |
| 9,758,265 B2 * | 9/2017 | Bellante | B65B 5/08 |
| 2010/0170591 A1 * | 7/2010 | Murray | B65B 43/42 141/1 |
| 2011/0064553 A1 * | 3/2011 | Lanfranchi | B29C 49/4205 414/730 |
| 2013/0160399 A1 * | 6/2013 | Rosselli | B65B 35/58 53/236 |
| 2013/0240008 A1 * | 9/2013 | Baker | H02S 20/00 136/244 |
| 2014/0154036 A1 * | 6/2014 | Mattern | B25J 9/1612 414/729 |
| 2016/0083124 A1 * | 3/2016 | Last | B65B 5/06 53/410 |

* cited by examiner

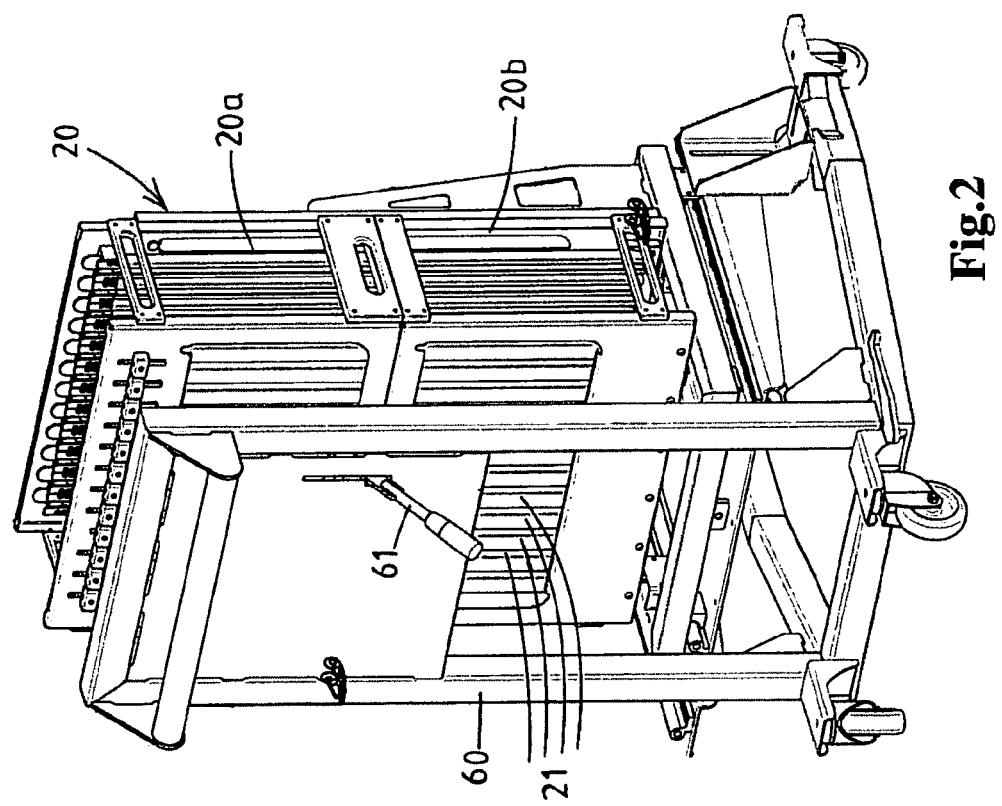

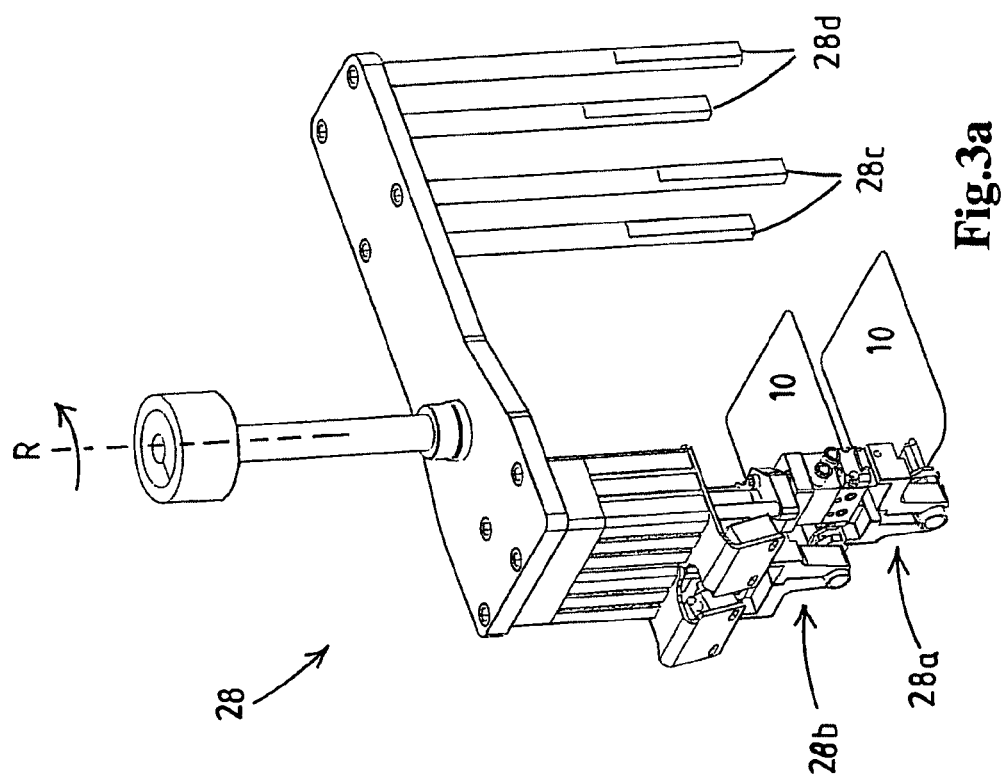

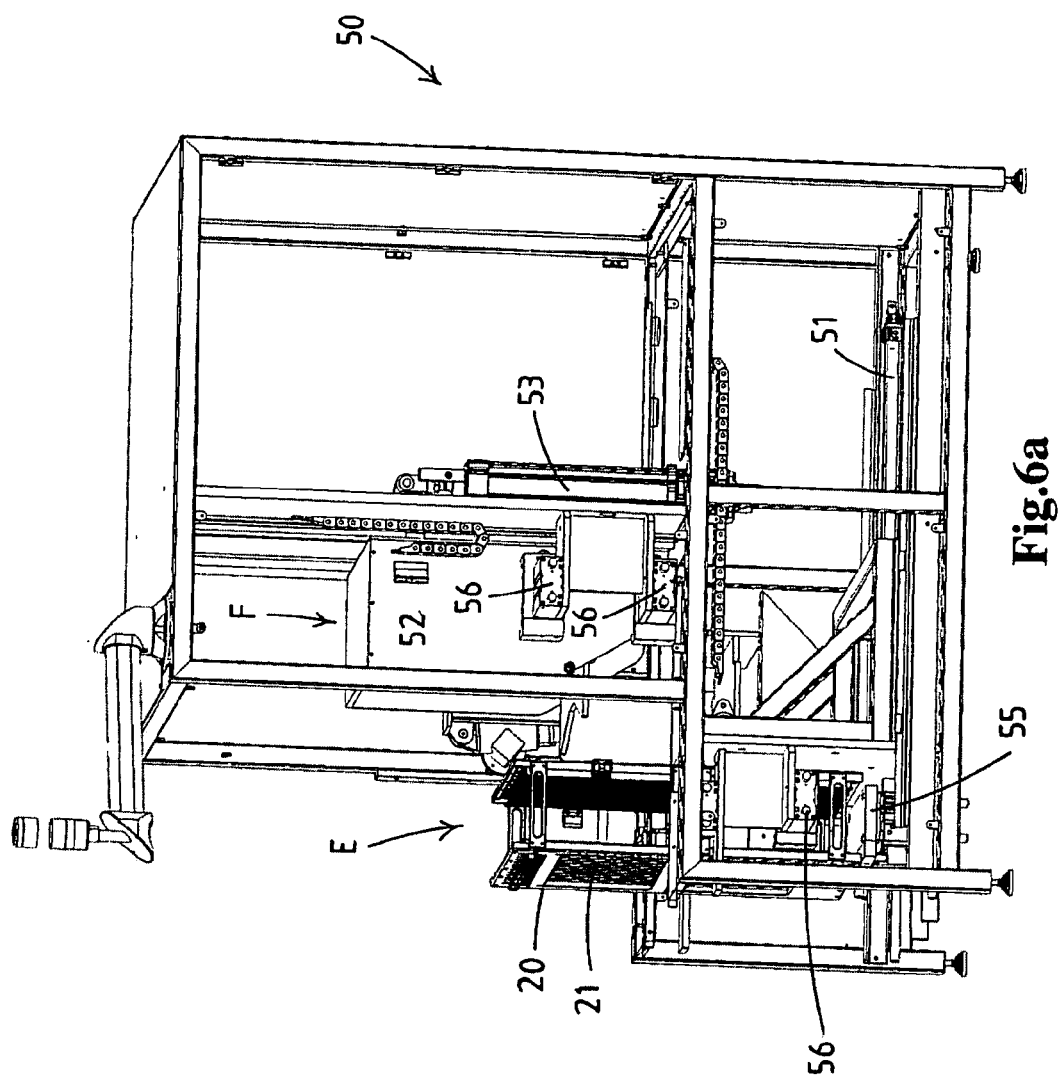

POUCH COLLECTION ROBOT SYSTEM AND METHOD FOR THE ASSEMBLY AND COLLECTION OF NON-FILLED SPOUTED POUCHES

The present invention relates to a pouch collection robot system, method for the assembly and collection of non-filled spouted pouches, storage cassette, gripping device, and a combination of storage cassette and gripping device for non-filled spouted pouches.

It is common known to, in an assembly line, assemble spouts and pouches made out of foil. Commonly, the thus obtained non-filled spouted pouches are subsequently filled with product and sealed, e.g. by a cap. A filling device is used to fill the spouted pouches, e.g. with products such as food and beverage products, chemical and personal care products, and medical and pharmaceutical products. The product may have a form that is pasty, liquid, granular or a combination thereof. Generally, automated machines for high-volume mass production of filled pouches are employed.

For several reasons, it is frequently desired to produce and assemble the spouted pouches at a location remote from the filling location. For example, when the product is produced a short time before the filling takes place, this requires a production facility suitable for producing the product, which inherently has different production facility requirements compared to a production facility for producing spouted pouches. These different production facility requirements may be difficult to match. Another reason may be the difficulty to match production capacities, in particular in terms of quantity, of these different processes.

Hence, in the field of spouted pouches, it is known to assemble and collect non-filled spouted pouches at a location remote from the filling location, and subsequently transport the non-filled spouted pouches to the filling device. The logistic costs of the spouted pouches will be part of the overall cost of the product.

The aim of the invention is to provide a pouch collection robot system, method for the assembly and collection of non-filled spouted pouches, storage cassette, gripping device, and a combination of storage cassette and gripping device for non-filled spouted pouches, resulting in more efficient logistics of the non-filled spouted pouches and preferably to a cost reduction of the logistics.

This aim is achieved by a pouch collection robot system according to the present disclosure, a method for the assembly and collection of non-filled spouted pouches according to the present disclosure, a storage cassette for non-filled spouted pouches according to the present disclosure, a gripping device for non-filled spouted pouches according to the present disclosure, and a combination of storage cassette and gripping device for non-filled spouted pouches according to the present disclosure.

With such a pouch collection robot system, gripping device and and method for the assembly and collection of non-filled spouted pouches, the non-filled spouted pouches are collected efficiently in storage rails, e.g. in a storage cassette. The storage rails stacked with non-filled spouted pouches are transported to the remote filling device.

In an assembly line one or more stations are provided where spouts and pouches made out of foil are assembled into spouted pouches. As such, a flexible pouch is made, preferably by opposing sheets of foil material, which may assume various shapes, such as a gusset pouch, cylindrical, cubical, conical, or the like. The pouch is preferably manufactured from foil sheets of laminate foil material. In an embodiment, the pouch is manufactured to include an opening for accessing or dispensing the contents therein. The opening may be formed anywhere on the pouch, such as along the side of the pouch, or in a portion of a wall of the pouch. The opening is fitted with a spout.

The spouts may e.g. be produced by injection moulding plastic material. Commonly, the spout includes a neck forming an opening and defining a longitudinal passage for accessing or dispensing the product therein, and a sealing portion to which the opening of the pouch is sealed, wherein the neck has a smaller diameter than the sealing portion. Commonly, in the assembly line the spouts are held by the neck, while the pouch is sealed to the sealing portion, e.g. by heat sealing.

Preferably, the spouts of the spouted pouches comprise an engagement surface to engage a storage rail, in order to collect the spouts of the spouted pouches in the storage rail. In a preferred embodiment, the spouted pouches comprise a collar structure extending radially from the outer surface of the spout, in particular the neck of the spout, the collar structure including an engagement surface for engaging the storage rail.

The non-filled spouted pouches are discharged out of the assembly line and dropped onto a conveyor.

The pouch collection robot system according to the invention is able to handle non-oriented spouted pouches on the conveyor, and accordingly any way of discharge by dropping is allowed. As a consequence, the method and system according to the invention can be used in combination with many types of existing assembly lines for spouted pouches. The conveyor onto which the spouted pouches are dropped can be any suitable conveyor having a movable surface for receiving the dropped spouted pouches, such as a transport belt conveyor, a rotating plate, etc. etc.

The pouch collection robot system of the invention comprises a camera system operable to perform visual observations on the conveyor, identifying the non-filled spouted pouches that have been dropped onto the conveyor. In an embodiment, the camera system is positioned above the conveyor, downstream of the at least one pick and place robot unit. It is also conceivable that a camera system is provided at the pick and place robot unit, instead of in addition to the camera system downstream of the robot units. In embodiments with multiple pick and place robot units, it is conceivable that each pick and place robot unit is embodied with a camera system.

In the pouch collection robot system of the invention the non-filled spouted pouches are collected in multiple storage rails, which are positioned adjacent the conveyor. These storage rails are each embodied to hold a plurality of spouted pouches by engaging on their spouts. The storage rails have at least one open end into which the spouted pouches are placeable.

In an embodiment, the storage rails are each provided with a single longitudinal slot. Such a storage rail is in particular advantageous to store spouted pouches comprising a collar structure extending radially from the outer surface of the spout, in particular the neck of the spout, the collar structure including an engagement surface for engaging the storage rail. The spout portion with the collar is collectable in the storage rail, while the rails engage the spouted pouches by their collar, and the remainder of the spouted pouch, in particular the remainder of the spout and the pouch is allowed to extend away from the slot of the rail. In particular, the longitudinal axis of the neck of the spout extends through and perpendicular to the longitudinal slot. In a horizontally orientated rail, the pouches suspend from the rail. Alternatively, as is preferred, the rails to be filled with spouted pouches may also be oriented vertically. The vertical orientation is advantageous as the non-filled spouted pouches are generally horizontally conveyed on the conveyor, and the vertically oriented rail enables the non-filled spouted pouch to be placed into the storage rail without having to perform a pivoting motion of the non-filled spouted pouch about a horizontal pivot axis. In addition, the vertical orientation may be advantageous in view of gravity.

When placed in the rail, the pouches sealed to the spout extending away from the rail may be allowed to extend in any orientation with respect to the longitudinal slot of the rail: parallel or perpendicular or any orientation there between. The pouches of multiple spouted pouches may be in contact with each other.

In general, the dimensions of a storage rail slightly exceed that of a spout, but are much smaller than the dimensions of a pouch. Hence, the spout is allowed to fit into the storage rail, while a much larger pouch extends away from the rail. Hence, when multiple rails are provided, the pouches are allowed to overlap.

In an embodiment, the storage rail has an elongated first wall, and a pair of side walls extending from opposing sides of the first wall so as to form a generally "U" shape. The storage rail further includes a pair of inward flanges. One of the pair of flanges is disposed on one of the pair of side walls, and the other of the pair of flanges is disposed on the other of the pair of side walls. Each of the pair of flanges extends towards each other and is spaced a predetermined distance apart from the other so as to form a longitudinal slot extending along the length of the storage rail. The flanges of the storage rail are configured to engage the engagement surface, e.g. the collar of the spout so as to hold the spouts.

Preferably, at at least one head end of the storage rail, the storage rail is provided with an open end into which the spout may be slid such that the support surface of the collar of each spout rests against a portion of each of the flanges of the storage rail.

The storage rail may be stamped out of a durable material such as steel. It should be appreciated that the length of the U-shaped storage rail will determine the number of spouted pouches that the storage rail can hold. Possibly, 40-60 spouted pouches are stacked into each rail, but also embodiments of storage rails are known storing a few hundred of spouted pouches.

The advantage of using storage rails is that storage rails enable the consistent, accurate and quick feeding of spouted pouches to a filling device. The rails preferably assure a defined orientation of the spouted pouches when introducing them into the filling device, reducing errors and facilitating efficiency in the filling processes.

The pouch collection robot system comprises a pick and place robot unit. Pick and place robotic technology is commonly applied for picking tasks where speed and accuracy are crucial. Such a pick and place robot system may also be referred to as a "delta-robot". Comprising a camera system such as 2D or 3D vision systems and possibly also conveyor tracking technology, these robots are capable of picking and placing up to 100-500 items per minute. High-speed pick and place robots are generally used for fast assembly, inspection and quality control, fast packaging, and fast sortation. These robots provide a high output, while reducing operating costs and ergonomic issues. The pick and place robot system according to the invention is operable to stack and collect the spouted pouches efficiently into the multiple storage rails.

In a possible embodiment, two or more pick and place robot units are provided, wherein preferably the pouch collection robot system comprises load balancing software to divide the spouted pouches on the conveyor between the pick and place robot units.

The pick and place robot unit of the invention comprises a gripping device and a robot arm connected to the gripping device, adapted to transport the gripping device. In an embodiment, the pick and place robot unit is operable to move the gripping device in an XY translation in a horizontal plane. Preferably, also movement in a vertical direction is possible to obtain a distance with the conveyor belt. In order to orient the pouch with respect to the rail, also rotation of the gripper about a vertical axis is preferred. In embodiments, the pick and place robot unit provided four degrees of freedom to position the gripping device: XYZ translations, as well as rotation about a vertical axis.

The gripping device comprises at least one gripper that is adapted to pick up a non-filled spouted pouch from the conveyor, and to place the non-filled spouted pouch into alignment with one of the multiple storage rails, allowing the non-filled spouted pouch to be placed into the storage rail. As indicated previously, a spout commonly includes a neck forming an opening and defining a longitudinal passage for accessing or dispensing the product therein, and a sealing portion to which the opening of the pouch is sealed. Preferably, the gripper grips the neck of the spout.

Possibly, the gripping device is a dual head gripper comprising two grippers, each one adapted to pick up a spouted pouch from the conveyor. Hence, the two grippers can each pick up a spouted pouch. The picking up preferably takes place consecutively, and the dual head gripper preferably allows the picking up of two spouted pouches having a different orientation. Preferably, the grippers are arranged each other in the dual head gripper, such that the dual head gripper is adapted to place the two spouted pouches into two storage rails substantially simultaneously, which storage rails are preferably arranged parallel and side by side in a row. Hence, preferably the spacing between the grippers corresponds to the spacing between the storage rails. As indicated before, due to the large dimensions of the pouches, the pouches are allowed to overlap when the spouted pouches are filled into multiple storage rails, in particular storage rails arranged side-by-side. Such a dual head gripper preferably has a capacity to pick up about 80 pouches per minute, preferably up to 100 pouches per minute. In a pouch collection robot system comprising multiple pick and place robot units, preferably each robot unit is provided with a gripping device embodied as a dual head gripper.

According to the invention, the gripper places the non-filled spouted pouch into alignment with one of the multiple storage rails. It is conceivable that the same the non-filled spouted pouch is placed into the storage rail upon placing another non-filled spouted pouch into alignment with the storage rail.

In embodiments, the pouch collection robot system is furthermore provided with a press device that is adapted to be brought into alignment with at least one of the multiple storage rails, and that is adapted to press the non-filled spouted pouch that is placed into alignment with the storage rail into the storage rail. It is both conceivable that the storage rail is positioned horizontally or vertically. Such a press device may be a separate device provided adjacent the storage rails.

In embodiments, the gripping device is furthermore provided with one or more pressing rods, allowing the gripping device to substantially simultaneously place a spouted pouch into a first storage rail (21) and press a spouted pouch that has previously been placed into alignment with second storage rail by the pressing rod into the second storage rail. Advantageously, the pressing rod extends in the same direction as the storage rails, preferably vertically downwards. In order to perform both actions substantially simultaneously, preferably the mutual distance between the gripper and the pressing rod corresponds to the mutual distance between two storage rails. These may be adjacent storage rails, but preferably the pressing rod is provided opposite the gripper to press a spouted pouch in a rail opposite storage rail into alignment with which the spouted pouch is placed by the gripper.

In addition, it is conceivable that a press device is provided, or that the gripping device is provided with a pressing rod, that is adapted to engage on the pouch instead of on the spout (that is to be placed in the storage rail) of the spouted pouch. This may be provided instead of, or in addition to the press device or pressing rod that engages on the spouted pouch that has previously been placed into alignment with a storage rail.

The pouch collection robot system further comprises a controller adapted to control the pick and place robot unit on the basis of a stacking program and the observations from the camera system. As a result, the gripping device and robot arm connected to the gripping device are controlled to move to the conveyor, where the gripping device is operable to pick up in a picking action one or more spouted pouches from the conveyor, based on the observations from the camera system. The robot arm with gripping device and one or more spouted pouches are subsequently allowed to be transported from the conveyor to one of the multiple storage rails, based on a stacking program, where the gripping device is operated to place the one or more spouted pouches into alignment with one of the multiple storage rails, allowing the non-filled spouted pouch to be placed into the storage rail. Thus, the position of the spouted pouches is checked by the camera system, and this position is forwarded to the robot arm and gripper to be able to pick up the spouted pouch. The gripping device of a pick and place robot system allows picking up the spouted pouch from a non-oriented position on the conveyor.

In embodiments, multiple storage rails are positioned vertically and side by side adjacent the conveyor, each storage rail having an open top end and a vertical slot, allowing the pouches to extend essentially horizontally and perpendicular to the rail. A vertical orientation of the rail allows a vertical stacking, wherein the spouts are positioned in the open top end of the rail, and possibly pushed slightly into the rail.

In embodiments a storage rail retainer is provided, adapted to retain at least one row of storage rails side by side, wherein the storage rails are provided with longitudinal slots, which storage rails are retained with their slots parallel and vertically orientated and all facing the same direction in one row. The storage rails are provided with an open end at a head end of the rail, which open end is provided at the top side of the storage rail retainer. To prevent the spouted pouches from slipping out the rail, it is both conceivable that the rail itself is closed at its bottom and, or that the retainer or an alternative device is provided to close off the bottom end of the rail. The provision of a retainer to retain multiple rails is advantageous to transport the rails with pouches efficiently. Preferably, a retainer retains between 10-20 storage rails, arranged side by side.

In embodiments, the storage rails in the storage rail retainer are provided close to one another, allowing the pouches of the non-filled spouted pouches to overlap at their sides. This attributes to efficient stacking of the spouted pouches.

Possibly, the rails are arranged manually in the retainer by an operator. Alternatively, this is done automatically. In embodiments, the storage rail retainer is provided with a lower rail holder and an upper rail holder, adapted to hold one or more storage rails in the storage rail retainer. Preferably, the lower rail holder closes off the lower head end of the rail to prevent spouted pouches from falling out the rail, while the upper rail holder keeps the upper head end of the rail open.

In embodiments, each upper rail holder is provided with a spout receiving head, provided in alignment with and above the upper end of a storage rail, thereby keeping the upper head end of the storage rail open. In such embodiments, preferably the gripper is adapted to place the spout of a non-filled spouted pouch into the spout receiving head.

In embodiments, each spout receiving head is provided with a spring loaded spout retainer which is adapted to retain the spout in the spout receiving head, allowing the gripper to place the spout into the spout receiving head and subsequently move away from the spout receiving head without the spouted pouch, thereby leaving the spout retained in the spout receiving head. Hence, the gripper has placed the non-filled spouted pouch into alignment with one of the multiple storage rails.

In embodiments multiple storage rail retainers are positioned simultaneously adjacent the conveyor. Preferably at least one, preferably two, retainers are provided per pick and place robot unit. Consequently, it is possible to fill multiple storage rail retainers at the same time.

Possibly, the system further comprises multiple docking stations adjacent the conveyor, each one being provided to dock and store a storage rail retainer, such as a cassette, and a trolley adapted to move the storage rail retainer to and from a docking station. E.g, the trolley is adapted to transport a storage rail retainer with the stacked spouted pouches away from the docking station, preferably to a packaging device. Possibly, a docking system is provided to "dock" the retainer in the right position, e.g. a push/pull lever, operable by an operator. The combination of docking station and trolley allows, after removal of a storage rail retainer stacked with spouted pouches, an empty retainer to enter the docking station a.s.a.p, enabling an efficient collection process.

In embodiments, the storage rail retainer is embodied as a storage cassette comprising two opposite rows of storage rails, wherein the slots of the rails of one row are substantially opposite the slots of the rails of the opposite row. Consequently, in such a storage cassette 20-40 storage rails may be provided, each capable of storing 40-60 spouted pouches. Hence, a storage cassette is allowed to store 800-2400 spouted pouches. It is noted that in practice, filling devices are available with filling capacities in the order of 1000-6000 spouted pouches per hour.

In embodiments, the opposed rows of storage rails are provided close to one another, allowing the pouches of the non-filled spouted pouches to overlap at their ends opposite the spouts.

In embodiments, the storage cassette comprises an upper and a lower cassette part, wherein the lower cassette part is provided with a row of lower rail holders and the upper cassette part is provided with a row of opposed upper rail holders, wherein a lower rail holder and opposed upper rail holder are adapted to hold a rail in the storage cassette, and wherein the upper cassette part is removable from the lower cassette part while the lower cassette part maintains the support of the multiple storage rails. Such a design is in particular advantageous for further handling of the rails filled with spouted pouches. The storage cassette is advantageously used at the pouch collection location, where the non-filled spouted pouches are collected in rails and prepared for transport to a filling location. The cassette aids on the one hand to provide a dense package rails filled with spouted pouches, and on the other hand to conveniently pack the assembly of storage rails with spouted pouches into a package for further transport.

To this end, in embodiments an unloading device is provided that is adapted to remove the multiple storage rails with the stacked spouted pouches from the retainer, to form an assembly of stacked spouted pouches and multiple storage rails. Unloading conveniently occurs by lifting the storage rails with the spouted pouches up out of the retainer.

Such an assembly of stacked spouted pouches and multiple storage rails can advantageously be handled further by a manipulator moving the multiple storage rails with the stacked spouted pouches to a packaging device. The manipulator arm is advantageously capable of handling storage rails comprising 800-2400 spouted pouches.

In embodiments, the unloading device is adapted to remove the upper cassette part from the lower cassette part, thereby exposing the upper ends of the multiple storage rails with the stacked spouted pouches. Alternatively, the removal of the upper cassette part can be performed manually. The lower cassette part maintains the support of the multiple storage rails.

In embodiments, the unloading device is at a bottom part thereof provided with a horizontal rail engaging surface that is movable in an upward direction, to engage the lower ends of one or more storage rails, and push the storage rails upwards and thereby remove them from the lower rail holders of the lower cassette part, thereby releasing the multiple storage rails with the stacked spouted pouches from the lower cassette part, to form an assembly of stacked spouted pouches and multiple storage rails.

Advantageously, the unloading device is operable to move the multiple storage rails closer together, to obtain a compact assembly of stacked spouted pouches and multiple storage rails, resulting in even more efficient logistics. For example, the rails are pressed towards each other.

The present invention is also directed to the unloading device as described above per se, as it may be applied in combination with a storage cassette with storage rails filled with spouted pouches filled by an alternative pouch collection system.

In embodiments, a packaging device is provided which is adapted to pack the storage rails with the storage rails with stacked spouted pouches into a transportation package, such as a bag or box, e.g. made of plastic or cardboard, or a combination thereof. A manipulator is advantageously provided to transport the multiple storage rails with the stacked spouted pouches. As indicated above, the manipulator may transport the assembly of storage rails and stacked spouted pouches from the unloading device to the packaging device. It is also conceivable that in embodiments without a retainer or cassette the manipulator is used to directly transfer the storage rails from their position adjacent the conveyor to the packaging device.

As indicated previously, after filling the spouted pouches the pouches are sealed, e.g. by a sealing cap. It is conceivable that the spouted pouches are provided with caps before they are transported to the filling device, where the caps are removed during the filling process. Alternatively, it is also common to transport sealing caps to the filling device, independent of the spouted pouches.

The present invention also relates to a method for the assembly and collection of non-filled spouted pouches wherein use is made of a system according claim 1, comprising the following steps:
conveying non-filled spouted pouches onto the conveyor,
operating the camera system to perform visual observations on the conveyor, identifying the non-filled spouted pouches,
on the basis of a stacking program and the observations from the camera system, operating the controller to control the robot unit to:
pick up one or more non-filled spouted pouches;
transport the picked one or more, e.g. two, non-filled spouted pouches from the conveyor into alignment with one of the multiple storage rails,
placing the non-filled spouted pouches into the storage rail.

In a possible embodiment, the above method is followed by moving the multiple storage rails with the stacked spouted pouches by a manipulator to a packaging device, wherein the multiple storage rails with the stacked spouted pouches are packed in a package, such as a bag or box, e.g. made of plastic or cardboard. Possibly, the method is carried out in a clean room.

Advantageously, prior to the movement to the packaging position, an unloading device removes the multiple storage rails with the stacked spouted pouches from a storage rail retainer or storage cassette. In embodiments, the unloading device moves the multiple storage rails closer together, to obtain a compact package of spouted pouches and storage rails.

Possibly, the method is followed by:
transporting the multiple storage rails with the stacked spouted pouches to a remote filling device,
removing the spouted pouches from the storage rails,
filling the spouted pouches.

Optionally, these steps are followed by mounting a cap onto the spout, which may be a tamper-evident cap. Yet alternatively, a separate step enables the provision of a tamper-evident seal around the cap.

The provision of retainers, docking stations for retainers, trolleys and an unloading device allows for a method for the assembly and collection of non-filled spouted pouches, wherein a first empty retainer is provided at the docking station, where it is filled with spouted pouches. Once it is filled, the first retainer is removed from the docking station by the trolley and positioned adjacent the unloading device. A second empty retainer is provided to the docking station immediately after removal of the first retainer, allowing a continuous operation of the pouch collection robot system. The first retainer is subsequently unloaded, forming an assembly of stacked spouted pouches and multiple storage rails which can be handled further by the manipulator to a packaging device.

The invention further relates to a storage cassette comprising two opposite rows of storage rails that are embodied to hold a plurality of non-filled spouted pouches by engaging on their spouts, wherein the storage rails are each provided with a longitudinal slot, wherein the slots of the rails of one row are parallel and vertically orientated and all face the same direction, substantially opposite the slots of the rails of the opposite row, the storage cassette being provided with a row of lower rail holders and a row of opposed upper rail holders, wherein a lower rail holder and opposed upper rail holder are adapted to hold a rail in the storage cassette, wherein preferably the storage rails in a row are provided close to one another such that the pouches of the non-filled spouted pouches will overlap at their sides, and wherein preferably the opposed rows of storage rails are provided close to one another such that the pouches of the non-filled spouted pouches will overlap at their ends, opposite the spouts.

In embodiments, the storage cassette comprises an upper and a lower cassette part, wherein the upper cassette part is removable from the lower cassette part while the lower cassette part maintains the support of the multiple storage rails. Such a design is in particular advantageous for further handling of the rails filled with spouted pouches. The storage cassette is advantageously used at the pouch collection location, where the non-filled spouted pouches are collected in rails and prepared for transport to a filling location. The cassette aids on the one hand to provide a dense package rails filled with spouted pouches, and on the other hand to conveniently pack the assembly of storage rails with spouted pouches into a package for further transport.

In embodiments, each upper rail holder is provided with a spout receiving head, provided in alignment with and above the upper end of a storage rail, wherein a gripper is adapted to place a spout of a non-filled spouted pouch into the spout receiving head.

In embodiments, each spout receiving head is provided with a spring loaded spout retainer which is adapted to retain the spout in the spout receiving head, allowing the gripper to place the spout into the spout receiving head and subsequently move away from the spout receiving head without the spouted pouch, thereby leaving the spout retained in the spout receiving head. Accordingly, the gripper has placed the non-filled spouted pouch into alignment with one of the multiple storage rails.

The invention further relates to a gripping device for non-filled spouted pouches, adapted to be connected to a robot arm of a pick and place robot unit, comprising two adjacent grippers which are adapted to pick up two non-filled spouted pouches from a conveyor, and place the two spouted pouches substantially simultaneously into alignment with two of the multiple storage rails, arranged parallel and side by side in a first row. Advantageously, the gripping device further comprising two adjacent pressing rods extending vertically downwards, opposite the grippers, each of the pressing rods being adapted to press a spouted pouch that has previously been placed into alignment with a storage rail by the pressing rod into the storage rail, allowing the gripping device to substantially simultaneously place two spouted pouches into alignment with two storage rails of the first row, and press two spouted pouches that have previously been placed into alignment with two storage rails, arranged parallel and side by side in an opposed second row by the pressing rod into the storage rails of the opposed row.

The invention further relates to the combination of:
  a storage cassette comprising two opposite rows of storage rails that are embodied to hold a plurality of non-filled spouted pouches by engaging on their spouts, wherein the storage rails are each provided with a longitudinal slot, wherein the slots of the rails of one row are parallel and vertically orientated and all face the same direction, substantially opposite the slots of the rails of the opposite row, the storage cassette being provided with a row of lower rail holders and a row of opposed upper rail holders, wherein a lower rail holder and opposed upper rail holder are adapted to hold a rail in the storage cassette, a gripping device for non-filled spouted pouches, adapted to be connected to a robot arm of a pick and place robot unit, comprising two adjacent grippers which are adapted to pick up two non-filled spouted pouches from a conveyor, and place the two spouted pouches substantially simultaneously into alignment with two of the multiple storage rails, arranged parallel and side by side in a first row, wherein the mutual distance between storage rails in a row of the storage cassette corresponds to the mutual distance between the grippers of the gripping device, wherein preferably the mutual distance between the storage rails allows the pouches of the non-filled spouted pouches to overlap at their sides.

In embodiments, the gripping device of the above combination further comprising two adjacent pressing rods extending vertically downwards, opposite the grippers, each of the pressing rods being adapted to press a spouted pouch that has previously been placed into alignment with a storage rail by the pressing rod into the storage rail, allowing the gripping device to substantially simultaneously place two spouted pouches into alignment with two storage rails of the first row, and press two spouted pouches that have previously been placed into alignment with two storage rails, arranged parallel and side by side in an opposed second row by the pressing rod into the storage rails of the opposed row, wherein preferably the opposite rows of storage rails are provided close to one another such that the pouches of the non-filled spouted pouches will overlap at their ends, opposite the spouts.

In embodiments, in the storage cassette of the above combination each upper rail holder is provided with a spout receiving head, provided in alignment with and above the upper end of a storage rail, and wherein the gripper is adapted to place a spout of a non-filled spouted pouch into the spout receiving head, and wherein each spout receiving head is provided with a spring loaded spout retainer which is adapted to retain the spout in the spout receiving head, allowing the gripper to move away from the spout receiving head without the spouted pouch.

The invention will be described in more detail in relation to the drawings, in which:

FIG. 2 shows a trolley for and with a cassette dock and a cassette in a perspective view;

FIG. 3a shows a gripping device with a non-filled spouted pouch in a perspective view from above;

FIG. 6a shows an embodiment of an unloading station in a perspective view;

Figure 1A:
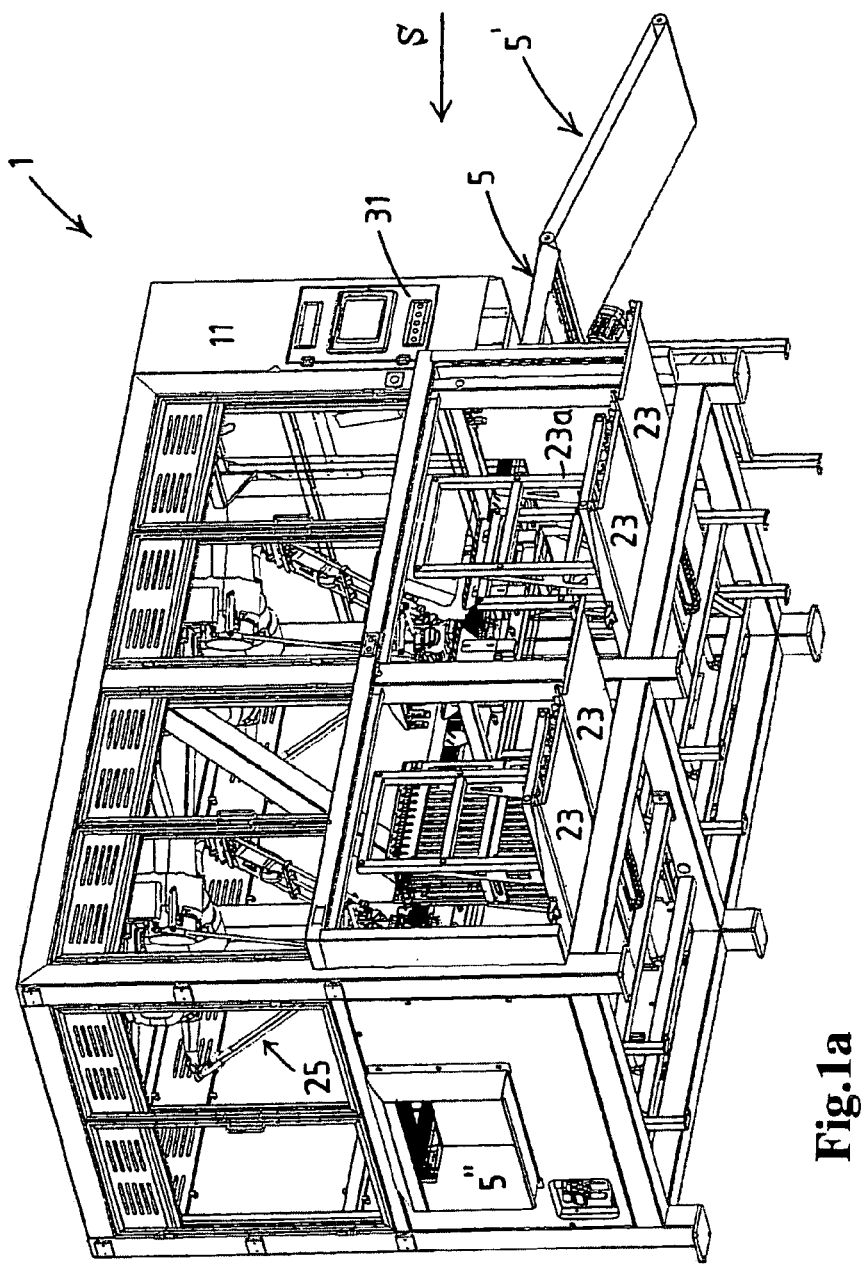
FIG. 1a shows a pouch collection robot system in a perspective view from below.
Figure 1B:
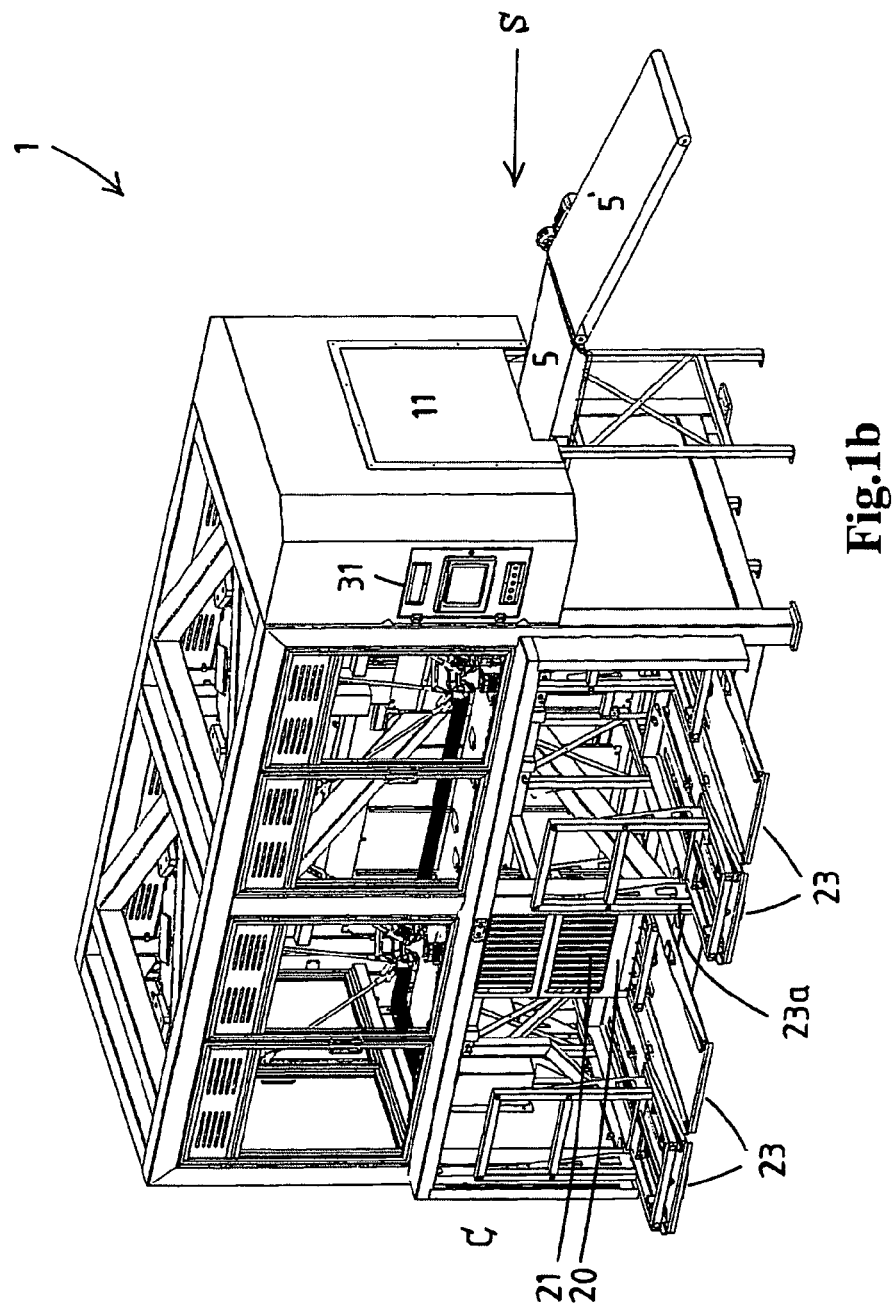
FIG. 1b shows the pouch collection robot system of FIG. 1a in a perspective view from above.
Figure 1C:
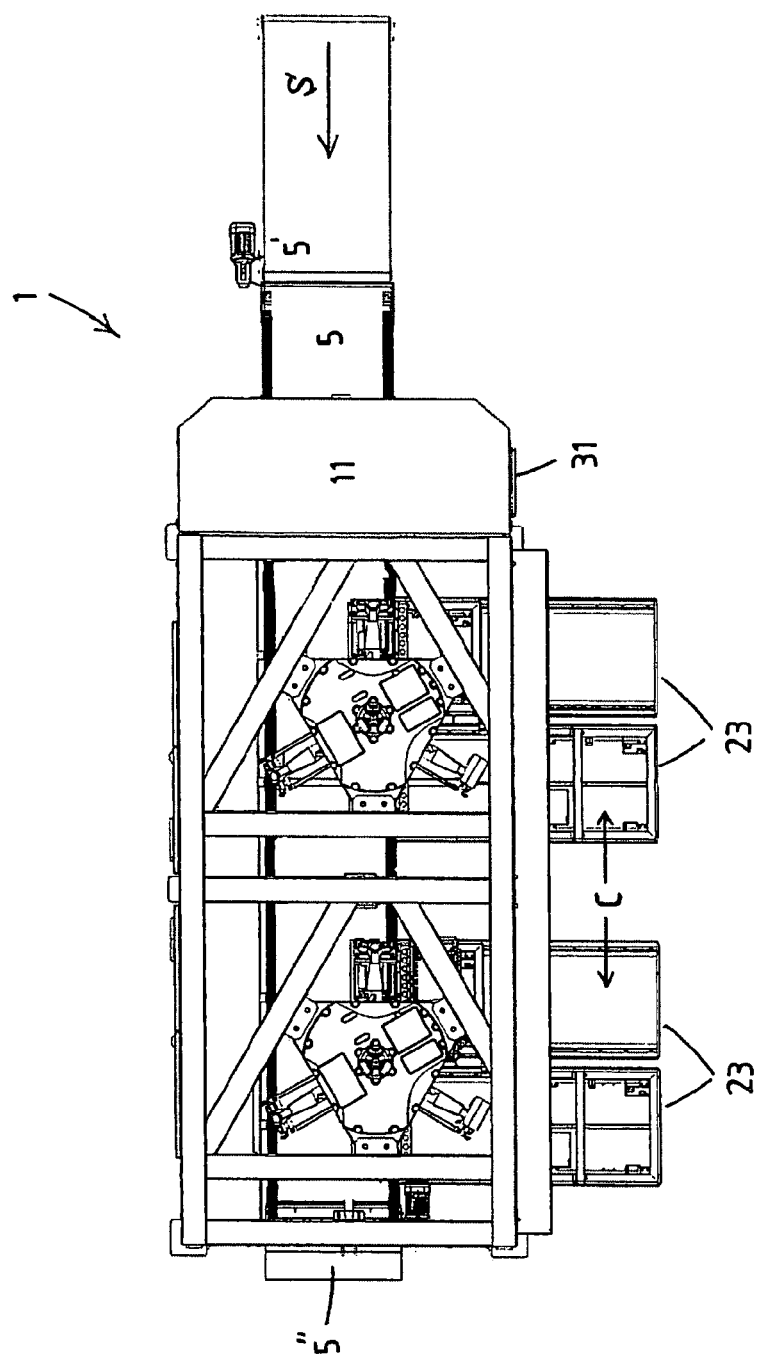
FIG. 1c shows the pouch collection robot system of FIG. 1a in a top view.
Figure 1D:
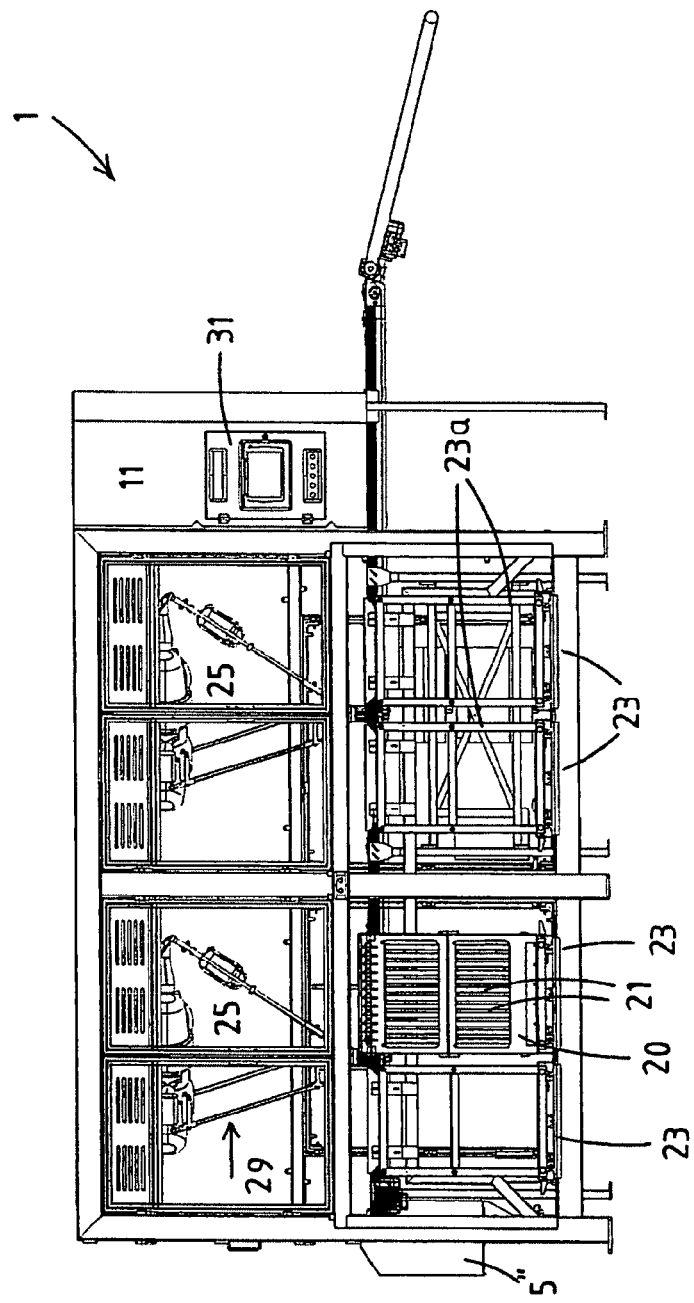
FIG. 1d shows the pouch collection robot system of FIG. 1a in a side view.

FIGS. 1a-f show a pouch collection robot system 1 for the collection of non-filled spouted pouches 10 to be transported to a remote filling device (not shown) in various views. Similar parts are indicated with same numerals. Optionally, the system 1 is positioned in a conditioned environment, such as a clean room.

In an assembly line (not shown) spouts and pouches made out of foil are assembled into non-filled spouted pouches 10. The spouted pouches 10 are discharged out of the assembly line and dropped onto a conveyor 5. Dropping implies that the non-filled spouted pouches leaving the assembly line are allowed to fall onto the conveyor belt, and will or may thus lay on the conveyor belt or other conveyor surface in a non-oriented position.

The direction of supply to the conveyor is indicated with arrows S; hence, from right to left the FIGS. 1a-f. A first conveyor portion 5' is visible at the entry side of a collection installation for non-filled spouted pouches, which connects to a further belt conveyor 5 within the pouch collection robot system 1. At a downstream end of the belt 5 it can be envisaged that pouches that are not collected by the pouch collection robot system are discharged, e.g. into a bin 5". It is envisaged that non-collected pouches can be returned into the supply S of the conveyor 5.

Adjacent the conveyor 5, here above the conveyor at the entrance of the pouch collection robot system 1, a camera system 11 is provided, that is operable to perform visual observations on the conveyor 5, thereby identifying and localizing the non-filled spouted pouches 10 lying on the belt 5.

The system further comprises multiple slotted storage rails 21, that are embodied to hold a plurality of non-filled spouted pouches by engaging on their spouts, which storage rails are positioned adjacent the conveyor. In view of the collection of many non-filled spouted pouches a storage rail retainer is provided, here embodied as a cassette 20, which is adapted to retain multiple storage rails 21. The storage rails 21 and storage cassette 20 will be explained later in more detail in relation to FIGS. 4 and 5.

One or more cassettes 20, each with multiple rails 21, are removably positioned at a collection location C adjacent the conveyor 5. The shown embodiment of a pouch collection robot system 1 is provided with four docking stations 23 adjacent the conveyor, each one being provided with a cassette dock 23a into which a cassette 20 filled with rails 21 can be docket. The shown configuration allows two cassettes 20 to be stationed per pick and place robot unit 25, allowing continuous operation of the robot units 25.

A trolley 60 (not shown in FIGS. 1a-1f, shown in FIG. 2) is provided to transport a cassette dock 23a with a cassette 20 with rails 21; in particular to move the cassette into a docking station 23 as well as remove a filled cassette 20 from the docking station. After removal of a filled cassette, the docking stations 23 can be provided with cassette docks with cassettes holding empty rails 21 efficiently.

An example of a trolley 60 is shown in detail in FIG. 2. A push/pull lever 61 is visible, which is used to 'dock' the cassette 20 in the right position in the pouch collection robot system 1.

The pouch collection robot system 1 as shown comprises two pick and place robot units 25, provided in line with each other in the direction of the conveyor 5.

Figure 1E:
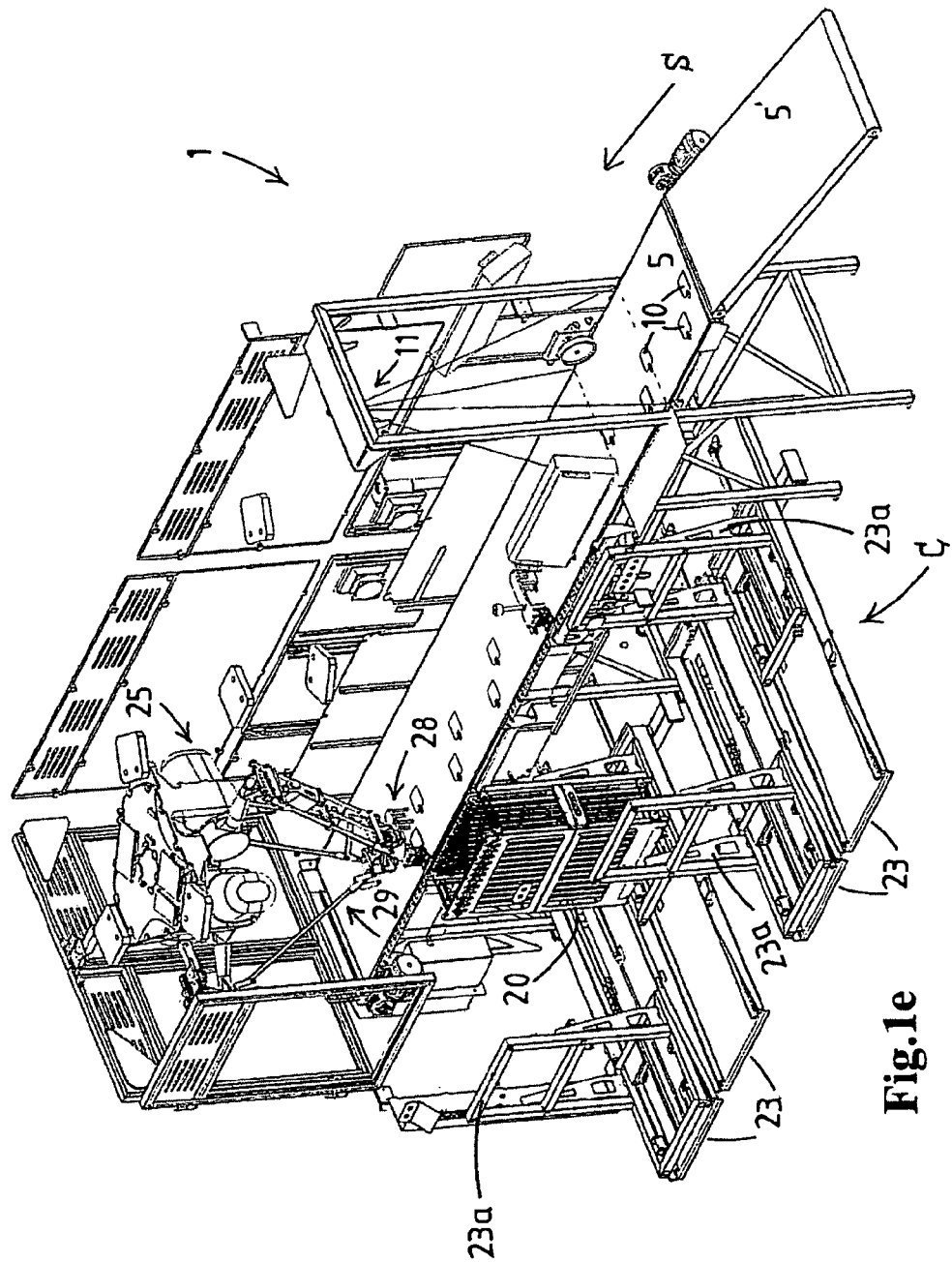
FIG. 1e shows the pouch collection robot system of FIG. 1a in a perspective cross-sectional view from below.
Figure 1F:
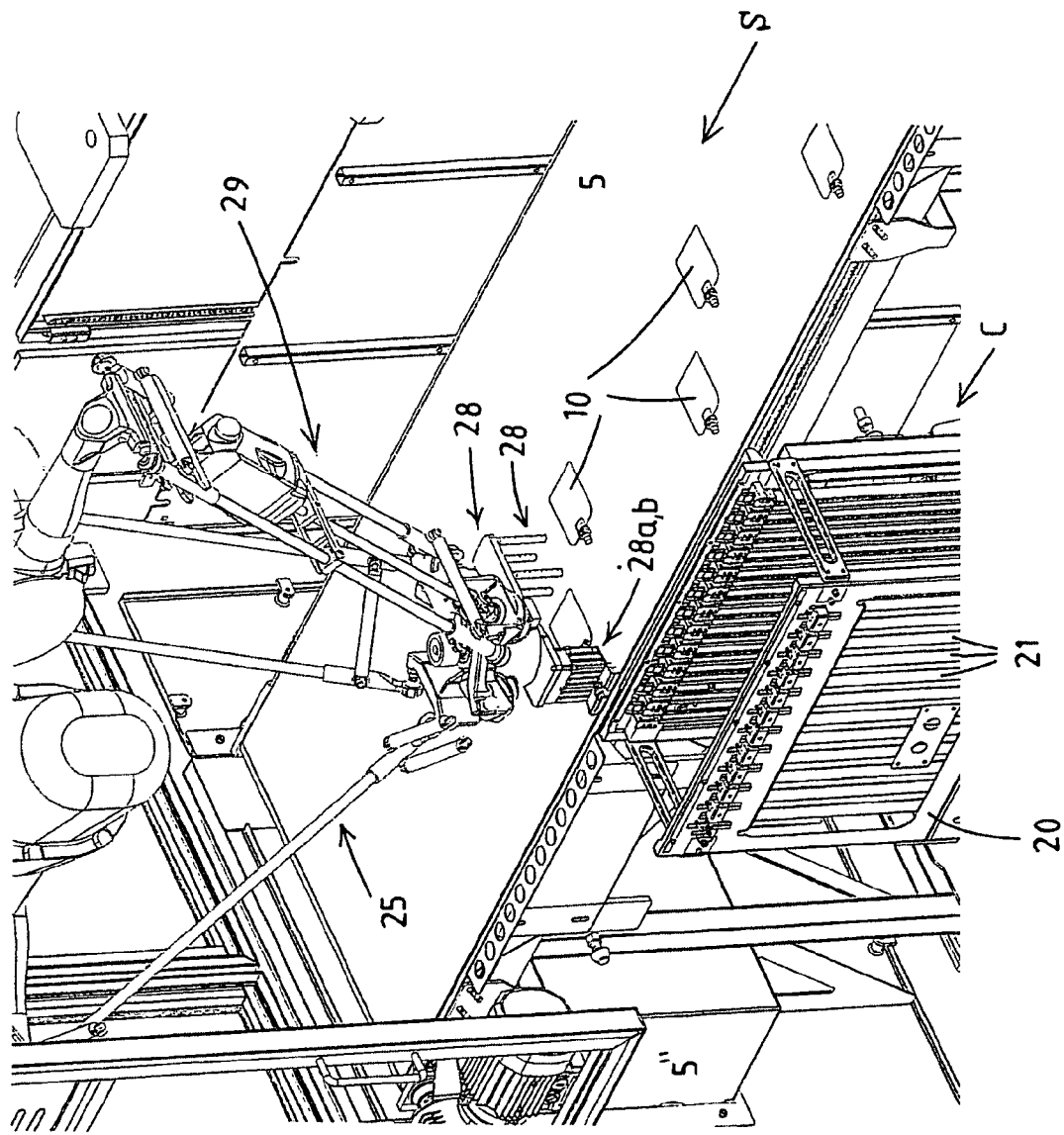
FIG. 1f shows a detail of the pouch collection robot system of FIG. 1a in a perspective view from above.
Figure 3B:
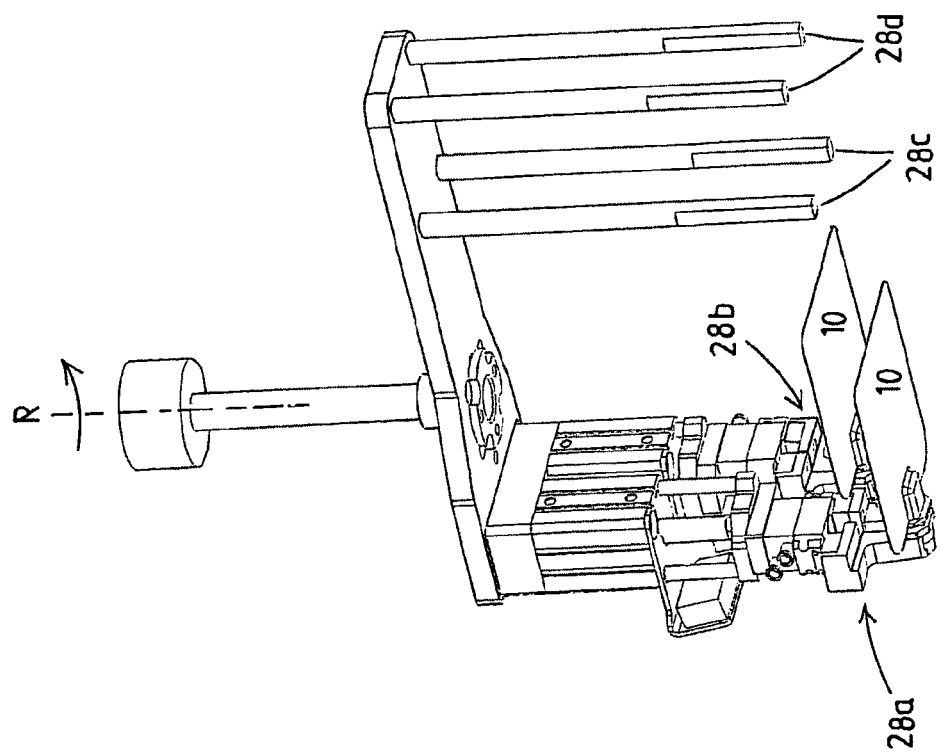
FIG. 3b shows the gripping device of FIG. 3a in a perspective view from below.

Each pick and place robot unit 25 comprises a gripping device 28, in particular visible in FIGS. 1e and 1f, and shown in detail in FIGS. 3a and 3b. The gripping device 28 of the shown embodiment comprises two independently actuated grippers 28a, 28b, each of which is adapted to pick up a single non-filled spouted pouch 10 from the conveyor 5, and to place the non-filled spouted pouch into alignment with one of the multiple storage rails 21, allowing the non-filled spouted pouch to be placed into the storage rail. Such a gripping device is also referred to as a dual head gripper. As is preferred each gripper 28a, 28b has two gripper fingers that can be actuated to grip a spout there between. The grippers 28a, 28b are operated to pick up two spouted pouches 10 consecutively, hence, gripper 28a may pick up a spouted pouch 10 from the belt 5, after which the gripper 28b is allowed to move to another spouted pouch where gripper 28b picks up a second spouted pouch 10. In the shown embodiment, the grippers 28a, 28b are arranged adjacent each other in the dual head gripper 28, such that the gripping device is adapted to place the two spouted pouches 10 into two storage rails 21 substantially simultaneously, which are preferably adjacent storage rails 21 arranged parallel and side by side in a row. Hence, the mutual distance between storage rails 21, here in a row of the storage cassette, corresponds to the mutual distance between the grippers 28a, 28b of the gripping device. Advantageously, the mutual distance between the storage rails allows the pouches of the non-filled spouted pouches to overlap at their sides.

Each pick and place robot unit 25 further comprises a robot arm 29 connected to the gripping device 28 and adapted to transport the gripping device to a non-filled spouted pouch and away from the conveyor 5 towards a storage rail 21. A computerized controller 31 is provided, that is adapted to control the at least one pick and place robot unit 25 on the basis of a stacking program, run on the controller, and based on the observations from the camera system 11.

The pick and place robot units 25 comprise a robot arm 29 composed of multiple interconnected rods, as is visible in detail in FIG. 1f. The shown robot arm 29 enables a translation movement of the gripper device 28 in the XY plane, over the conveyor belt 5, in order to pick up a non-filled spouted pouch from the conveyor belt, and a translation movement in the vertical plane, e.g. by a pneumatic actuator, in order to lift a non-filled spouted pouch from the conveyor belt. The robot arm 29 also enables a rotation of the gripper device 28 about a vertical rotation axis R, indicated in FIGS. 3a and 3b, thereby orienting the pouch of the non-filled spouted pouch with respect to the spout, enabling the pouch to extend away from the rail into which the spout is to be placed. This allows to rapidly align the grippers 28a, b with one of the opposed rows of rails 21 held by cassette 20.

In the shown embodiment of the gripping device 28, in particular visible in FIGS. 3a and 3b, the gripping device 28 further comprises two sets of adjacent pressing rods 28c, 28d.

According to the invention, the gripper places the non-filled spouted pouch into alignment with a storage rail. In embodiments, a press device is provided that is adapted to be brought into alignment with at least one of the multiple storage rails, and that is adapted to press the filled spouted pouch that is placed into alignment with the storage rail 21 into the storage rail. In a not shown embodiment, the press device is a separately provided device.

In the shown embodiment, the press device is embodied as a set of adjacent pressing rods 28d of the gripping device, extending vertically downwards, opposite the grippers 28a, 28b.

Each of the pressing rods 28d is adapted to press a spouted pouch, that has previously been placed into alignment with a storage rail, by the pressing rod into the storage rail. Hence, the gripping device 28 is allowed to substantially simultaneously place two spouted pouches into alignment with two storage rails 21 of a first row, and press two spouted pouches that have previously been placed into alignment with two storage rails, arranged parallel and side by side in an opposed second row, by the set of pressing rods 28d into the storage rails of the opposed row. The mutual distance between the gripper fingers of grippers 28a, 28b and the pressing rods 28d advantageously corresponds to the mutual distance between the centers of opposed storage rails 21.

As is visible the storage rails 21 are held in cassette 20 close to each other, as a result of which the pouch bodies 73 are allowed to overlap at the sides of the pouches, when they are collected by the storage rails 21. Accordingly, the pouch bodies 73 of the spouted pouches also overlap in the dual head gripper 28, as the grippers 28a, 28b are provided at the same close distance to each other.

In the shown embodiment an additional set of pressing rods 28c is provided that will engage on the two pouches of the spouted pouches that have previously been placed into alignment with two storage rails, arranged parallel and side by side in an opposed second row. Hence, each of the spouted pouches that have been positioned above a storage rail is pressed downwards into the storage rail by a pressing rod 28d engaging on the spout of the spouted pouch and a pressing rod 28c engaging on the spout of the spouted pouch 10.

Figure 4:
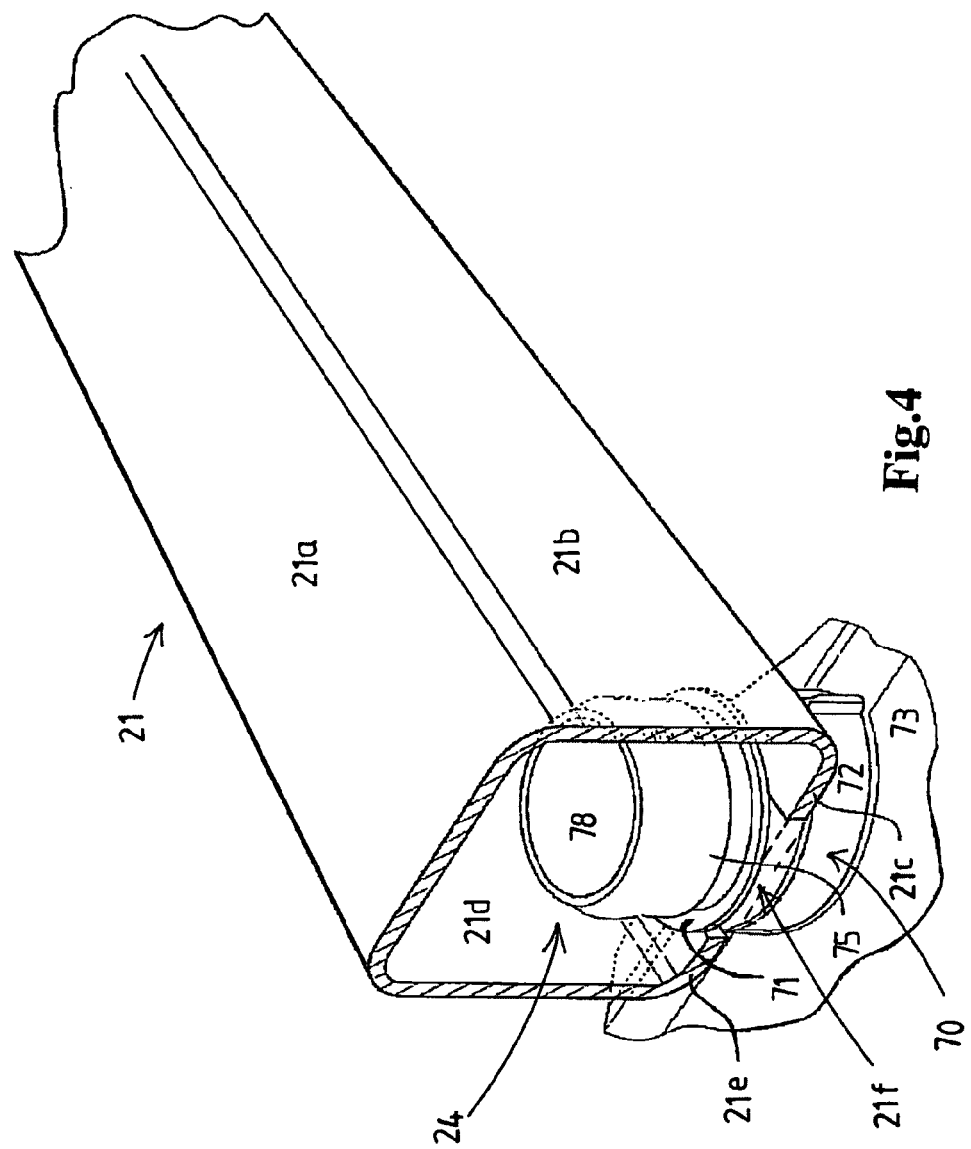
FIG. 4 shows a perspective view of a storage rail and a portion of a non-filled spouted pouch collected therein.
Figure 5A:
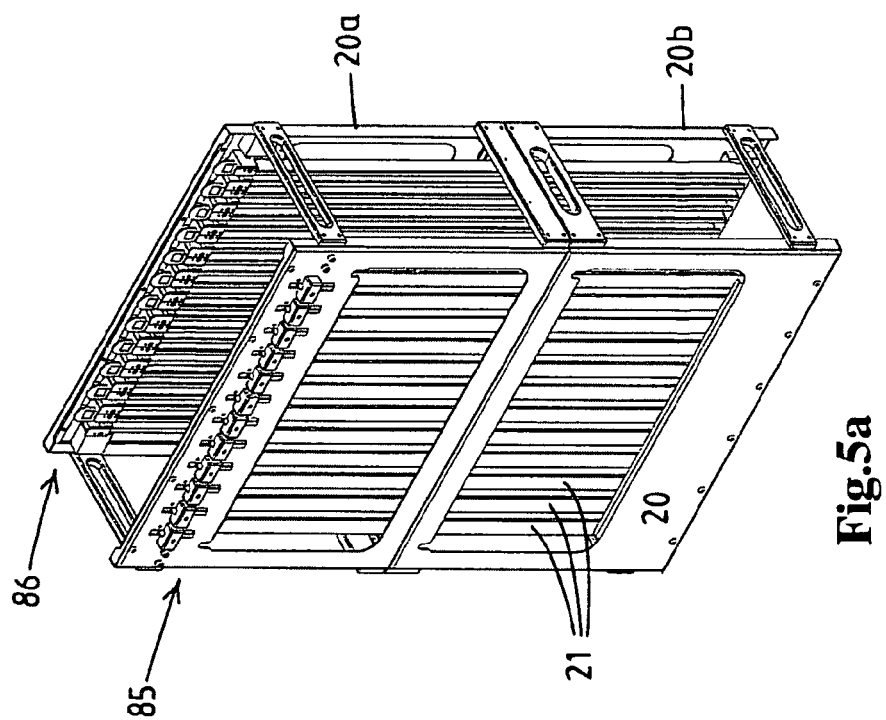
FIG. 5a shows an embodiment of a storage cassette in a perspective view from above.
Figure 5B:
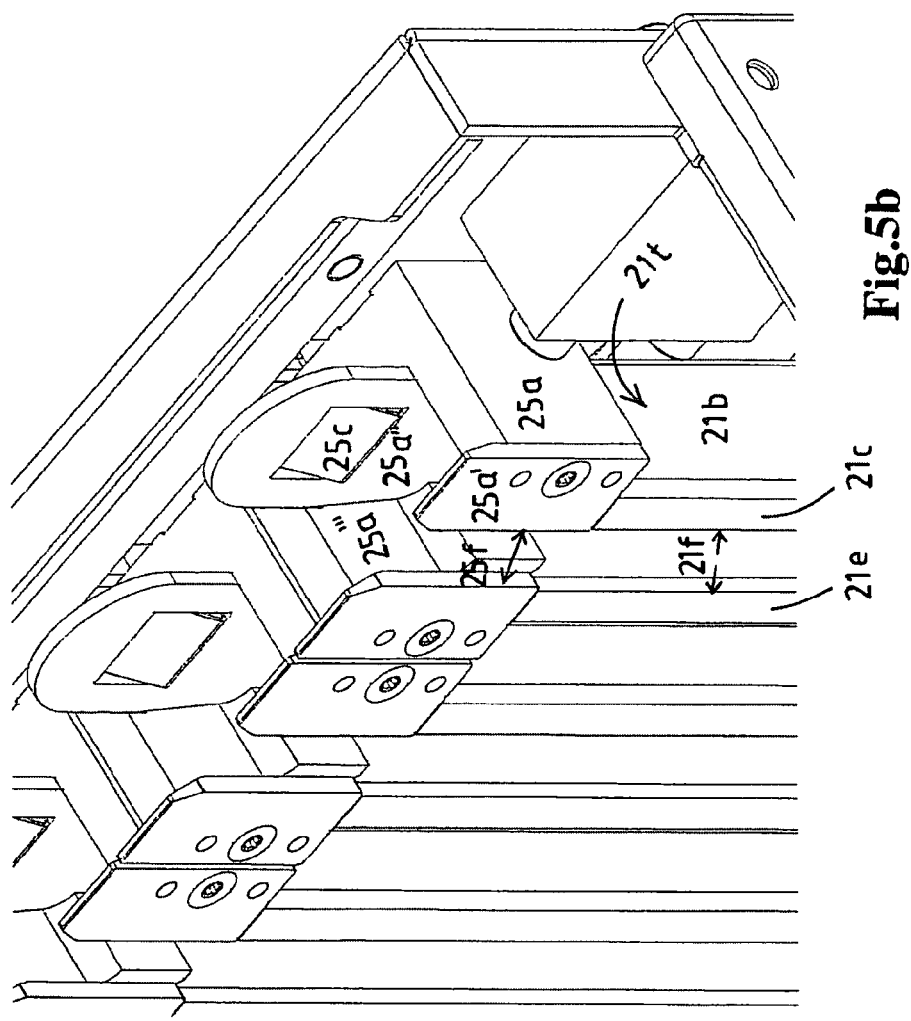
FIG. 5b shows a detail of an upper portion of the storage cassette of FIG. 5a in a perspective view from above.
Figure 5C:
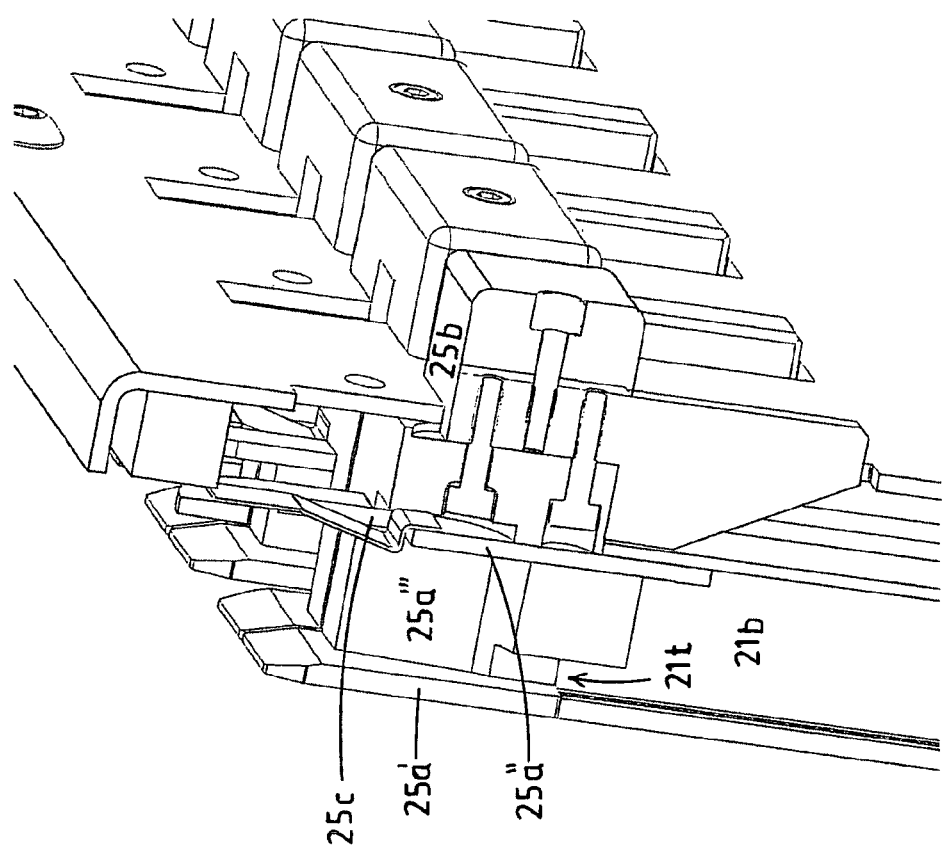
FIG. 5c shows a detail of an upper portion of the storage cassette of FIG. 5a in cross-section in a perspective view.
Figure 5D:
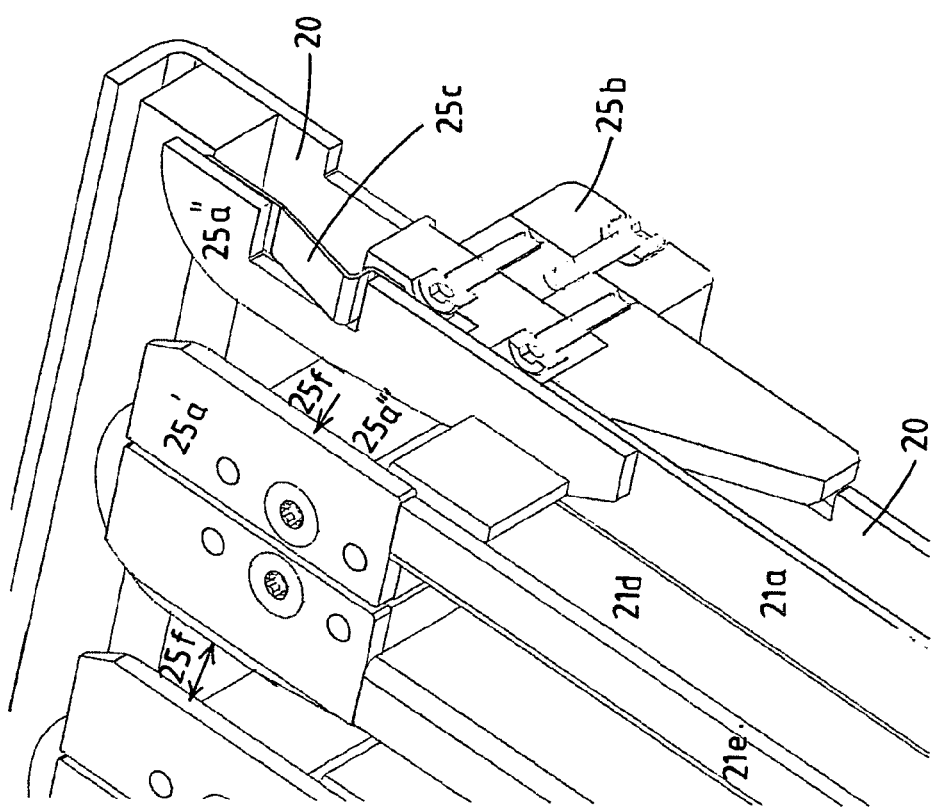
FIG. 5d shows the detail of FIG. 5c in an alternative perspective view.
Figure 5E:
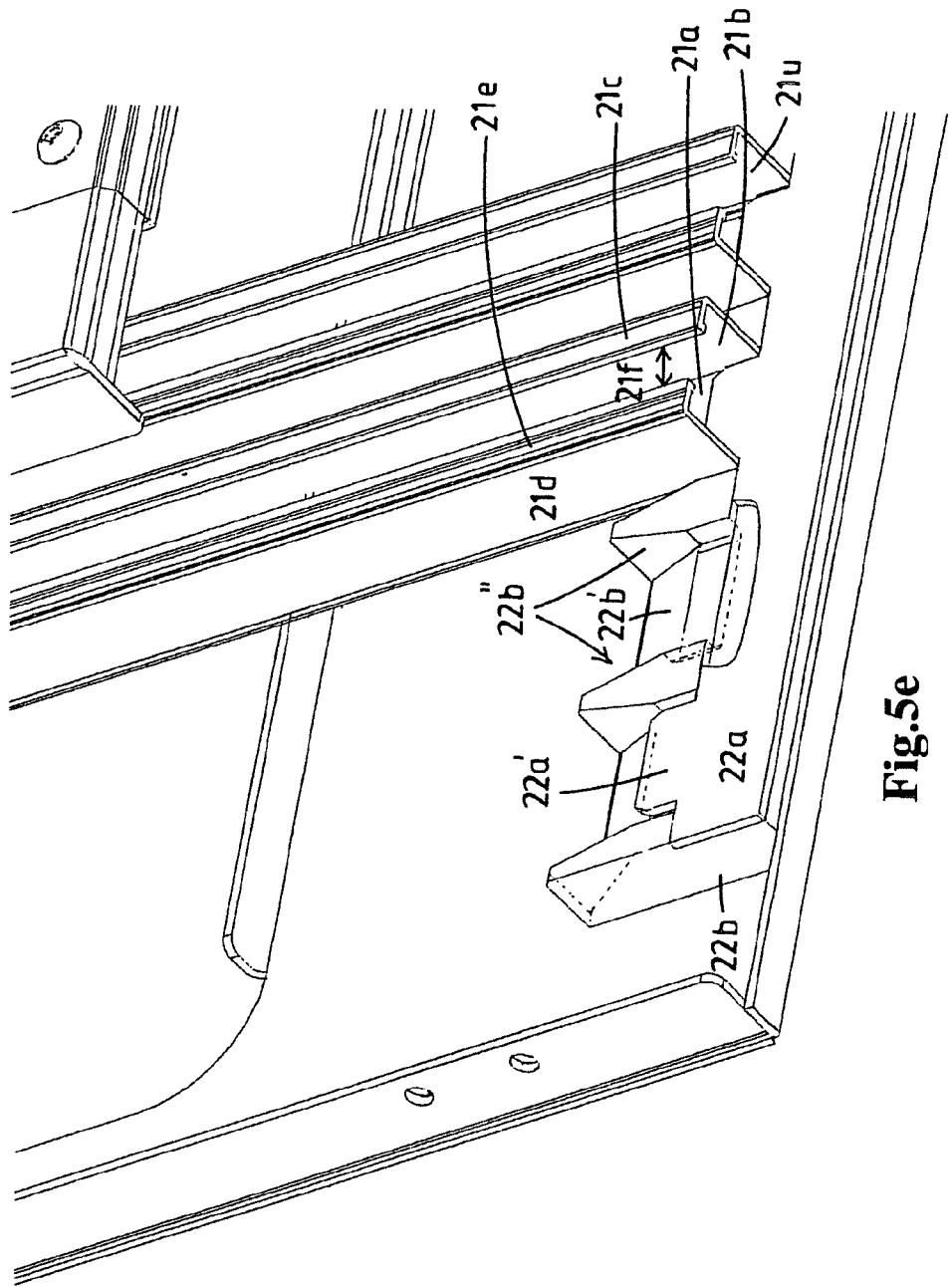
FIG. 5e shows a detail of an bottom portion of the storage cassette of FIG. 5a in a perspective view from above.

In FIG. 4, a perspective view of an embodiment of a storage rail 21 is shown in detail. The storage rail 21 is provided with a longitudinal slot 21f and is adapted to engage a spout, e.g. between two spaced apart flanges that extend around a neck of the spout. In the shown embodiment, a portion of a non-filled spouted pouch 70 collected in the rail 21 is visible.

In this embodiment, the spouted pouches 70 are provided with a spout having a collar 71. The storage rail 21 has an elongated first wall 21a, and a pair of side walls 21b, 21d extending from opposing sides of the first wall so as to form a generally "U" shape. The storage rail 21 further includes a pair of flanges 21c, 21e. One flange 21c of the pair of flanges is disposed on side wall 21b, and the other flange 21e is disposed on the other side wall 21d. Each of the pair of flanges 21c, 21e extends towards each other and is spaced a predetermined distance apart from the other so as to form a longitudinal slot 21f extending along the length of the storage rail 21.

Spouted pouch 70 is only partly shown, and also only schematically in FIG. 4. Only a small part of pouch foil body 73 is visible here, which is sealed to the sealing area of the spout 72. The spout further comprises a neck 75, here having a smaller diameter than the sealing area 73, and comprising a passage 78 for filling the pouch 70 and for dispensing the content from the pouch 70. On the neck 75, the spout is provided with a flange, group of flanges, or collar 71 extending radially from the outer surface of the neck of the spout. The neck may further include screw thread (not shown) for a cap. Possibly a cap is already present on the spout, e.g. a removable and replaceable cap secured to the spout, e.g. a screw cap. The collar 71 of the spout is adapted to engage on the rail 21, here by the flanges of the rail opposite the slot sliding between the flanges on the neck 75.

In FIGS. 5a-5e, an embodiment of a storage cassette 20 is shown. In the cassette 20, two opposed rows 85, 86 of multiple storage rails 21 in side-by-side parallel orientation are releasably retained. The slots 21f in the rails 21 of one row are substantially opposite the slots of the rails of the opposite row the opposed rows, and hence are both directed towards the space between the opposed rows of rails 21. In the shown embodiment, as is preferred, the storage rails 21 in the rows 85, 86 of the storage cassette 20 are provided close to one another, allowing the pouches of the non-filled spouted pouches to overlap at their sides.

In the shown embodiment, the distance between the opposed rows of rails 21 is such that a pouch 10 of which the spout is introduced into a rail does not become folded by contacting the opposite row of rails. Preferably, the opposed rows of storage rails are provided close to one another, allowing the pouches of the non-filled spouted pouches to overlap at their ends opposite the spouts. Accordingly, wherein the pouch bodies will overlap and thereby create a dense assembly of stacked non-filled spouted pouches in the cassette 20. In embodiments, the distance between the opposed rows may being slight greater than the length of a pouch foil body of the pouch, thereby creating a very dense assembly.

As is shown, the rails 21 are retained in vertical orientation in the cassette 20, at least when 30 the cassette is held in a cassette dock 23a for collection of non-filled spouted pouches 10 into the rails 21.

In the shown embodiment, the cassette 20 comprises an upper cassette part 20a and a lower cassette part 20b, wherein the upper cassette part 20a can be removed from the lower cassette part 20b while the lower cassette part 20b maintains the support or retention of the multiple storage rails 21. The rails 21 have an open top end 21t and an open bottom end 21u.

The lower part of the cassette 20 comprises a lower rail holder 22, adapted to releasably retain the open bottom end 21u of the storage rails 21. Such a lower rail holder 22 is shown in detail in FIG. 5e. Two storage rails 21 are visible, the configuration of which corresponds to the rail configuration of FIG. 4. To that end, same portions are given same reference numerals. The storage rail 21 is open at its lower end 21u, which enables the open bottom end 21u of the rail to be placed onto a rail holder 22, thereby simultaneously holding the rail and preventing stacked spouted pouches from falling out of the rail.

The shown embodiment of a lower rail holder 22 comprises a plate-shaped portion 22a comprising protruding parts 22a' which protrude into the open bottom end 21u of the rail 21. The bottom open end of the rail 21 is received by tapering surfaces 22b" of the other portion 22b of the lower rail holder, which together with the plate-shaped portion 22a fixates the open bottom end 21u of the storage rail 21 to the lower rail holder.

The upper part of the cassette 20a comprises an upper rail holder 25, adapted to releasably retain the open top end 21t of the storage rails 21, while keeping the top end 21t open to receive new spouted pouches from the pick and place robot unit. Such an upper rail holder 25 is shown in detail in FIGS. 5b, 5c and 5d.

In the shown embodiment, upper rail holder 25 comprises a spout receiving head 25a, provided at the inner side of the cassette 20 in alignment with and above the upper end 21t of a storage rail 21. The gripper of the pick and place robot unit is adapted to place the spout of a non-filled spouted pouch into the spout receiving head 25a. Here, the spout receiving head 25a has essentially the same cross-section as the storage rail, and tapers outwards from below to top. The spout receiving head 25a has a first wall 25a", and a pair of side walls 25a'" extending from opposing sides of the first wall 25a" so as to form a generally "U" shape. The spout receiving head 25a further includes a pair of flanges 25a', each disposed on another side wall 25a'". The pair of flanges 25a' extends towards each other and is spaced a predetermined distance apart from the other so as to form a longitudinal slot 25f extending in line with the longitudinal slot 21f of the storage rail 21.

At the rear (outer) side of the cassette 20, a cassette engaging portion 25b of the upper rail holder 25 is shown, fixating the spout receiving heads 25a to the cassette 20.

In the shown embodiment, each spout receiving head 25a is provided with a spring loaded spout retainer 25c which is adapted to retain the spout in the spout receiving head, allowing the gripper to move away from the spout receiving head without the spouted pouch.

Figure 6B:
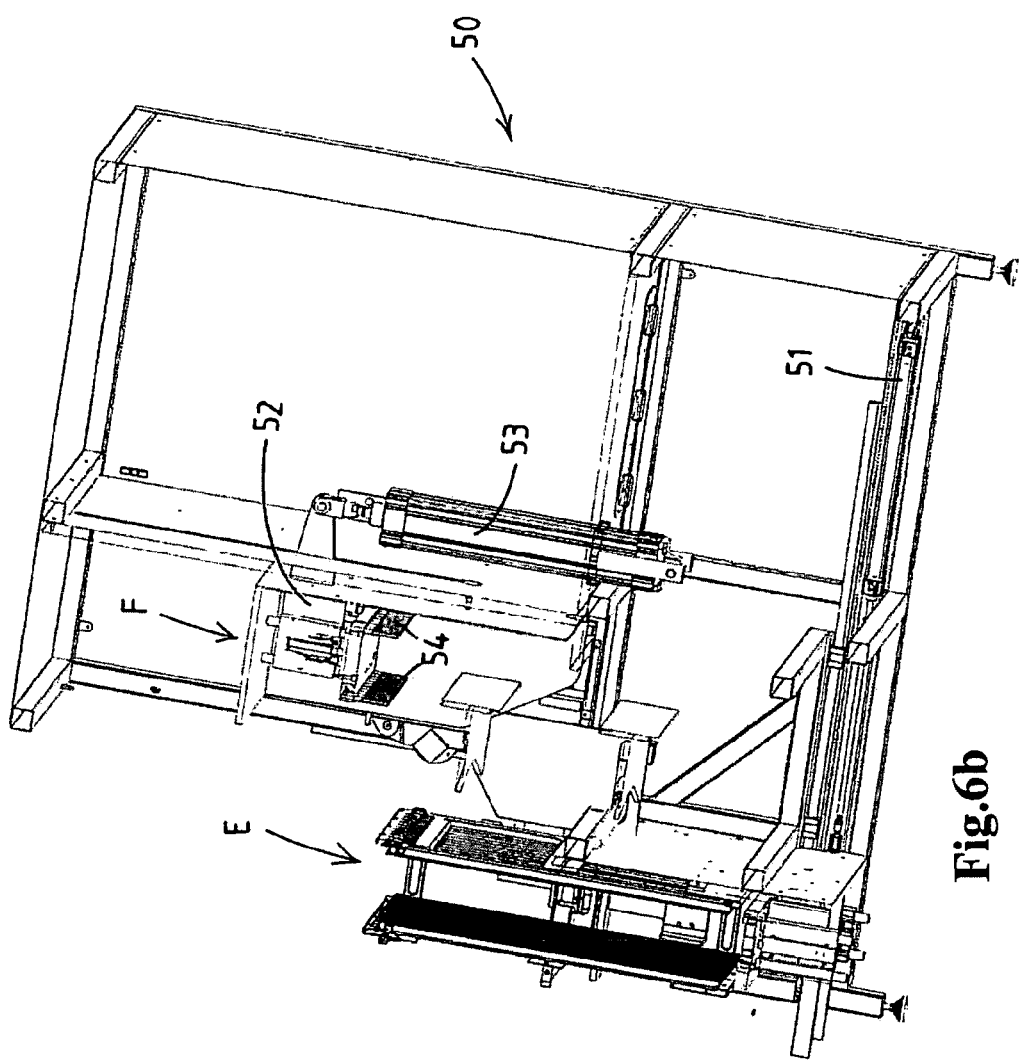
FIG. 6b shows the unloading station of FIG. 6a in cross-section in a perspective view.

In FIGS. 6a and 6b an embodiment of an unloading device 50 is shown, which is operable to engage on and to remove, as a unit, the multiple storage rails 21 with the stacked non-filled spouted pouches from a retainer, here the cassette 20, in order to form an assembly of stacked spouted pouches still retained by the two rows of multiple rails 21. In the shown embodiment, a trolley 60, as shown in FIG. 2, is adapted to convey a cassette 20 with rails 21 that have been filled with spouted pouches to the unloading device 50.

The unloading device 50 comprises a cassette entry position E, into which a storage cassette 20 is placed, e.g. by a trolley 60. This is the situation shown in FIGS. 6a and 6b. The unloading device is provided with cassette moving pistons 51, adapted to engage on the cassette 20 and retract the cassette 20 into the unloading device to an upper cassette part removal station F.

At the upper cassette part removal position F a cassette lifter 52 is provided, which is movable up and down by a piston 52, and which is adapted to engage the upper cassette part 20a and lift the upper cassette part 20a from the lower cassette part 20b. Thereby, the upper rail holders 25 remain attached to the upper cassette part 20a. As a result, the upper parts of the multiple storage rails with the stacked spouted pouches are exposed, while the lower cassette part 20b holds the rails at their bottom ends 21u.

The unloading device 50 is furthermore at a bottom part thereof provided with a with a horizontal rail engaging surface 55 that is movable in an upward direction, to engage the lower ends 21u of one or more storage rails, and push the storage rails upwards and thereby remove them from the lower rail holders 22 of the lower cassette part. As such, the multiple storage rails with the stacked spouted pouches are also released from the lower cassette part 20b, so as to form an assembly of stacked spouted pouches and multiple storage rails.

The unloading device 50 is operable to move the multiple rails 21 with the stacked spouted pouches closer together, in order to obtain a further compacted assembly of stacked spouted pouches and the rails 21. In particular, compressors 56 are provided at the sides of the storage rails to reduce the spacing between adjacent rails, and compression pins 54 are provided at the open top end 21t of the rails, to compress the spouted pouches within a rail prior to removal of the upper cassette part 21a.

Figure 7:
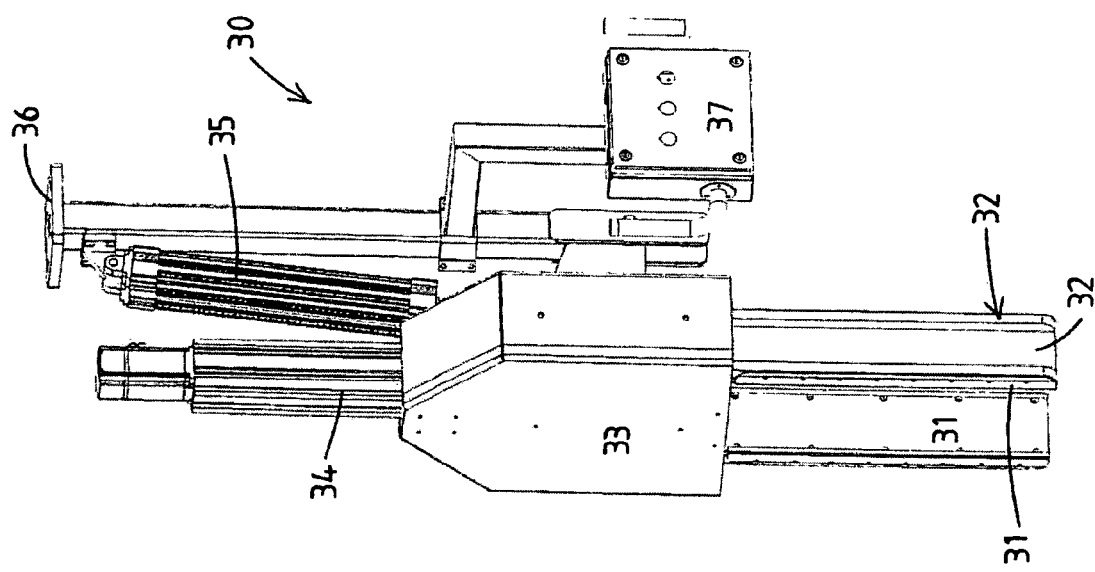
FIG. 7 shows an embodiment of a manipulator in a perspective view.

An assembly of stacked spouted pouches and multiple storage rails 21 can be conveyed to a packaging device by a manipulator 30, part of which is shown in FIG. 7. Advantageously, the manipulator can be connected via connector 36 to another transport device, e.g. a crane or balancer. The manipulator 30 comprises two arms 32 with contact surfaces 31 to engage the rails of the assembly of spouted pouches and rails. Advantageously, the compressed assembly of spouted pouches and rails is brought to the cassette entry position E of the unloading device to be fully exposed, and allow the contact surfaces 31 of the manipulator 30 to engage the rails of the assembly. The manipulator is subsequently allowed to move to the packaging device. Advantageously, the arms 32 of the manipulator are slim, to be able to bring the rails into a box or the like and subsequently retract from the box or the like. The arms 32 and contact surfaces 31 of the manipulator can move towards and away from each other by a mechanism 33 and actuator 34. The arms 32 and contact surfaces 31 of the manipulator 30 can be positioned by actuator 35. The manipulator is operable via operating device 37.

The packaging device is advantageously adapted to pack the rails 21 with the stacked spouted pouches therein into a transportation package, such as a bag or box, e.g. made of plastic or cardboard.

The invention claimed is:

1. Pouch collection robot system for the collection of non-filled spouted pouches to be transported to a remote filling device, comprising:
   a conveyor adapted to receive non-oriented non-filled spouted pouches;
   a camera system provided adjacent the conveyor, operable to perform visual observations on the conveyor, thereby identifying the non-oriented non-filled spouted pouches,
   multiple storage rails embodied to hold a plurality of non-filled spouted pouches by engaging on their spouts, which storage rails are positioned adjacent the conveyor, wherein at least part of the multiple storage rails have a defined mutual distance;
   at least one pick and place robot unit, each unit comprising:
      a spout gripping device, wherein the pick and place robot unit is operable to move the spout gripping device in an XY translation in a horizontal plane, the spout gripping device comprising two spout grippers, which spout grippers are arranged adjacent each other with a spacing there between, wherein the spacing between the spout grippers corresponds to the defined mutual distance between the multiple storage rails, and wherein each spout gripper has two gripper fingers to grip a spout there between, and which two spout grippers are adapted
         to grip the spouts of the pouches and to pick up from the conveyor two of said non-oriented non-filled spouted pouches whereby the pouches of the two non-filled spouted pouches overlap,
         to place said two non-oriented non-filled spouted pouches into alignment with two storage rails at said defined mutual distance substantially simultaneously thereby orienting the two non-filled spouted pouches, whereby the pouches of the two non-filled spouted pouches overlap in a direction parallel to the multiple storage rails, and subsequent to the placement of the two non-oriented non-filled spouted pouches into alignment with the two storage rails and without releasing the two oriented non-filled spouted pouches, to place said two oriented non-filled spouted pouches into said two storage rails substantially simultaneously, a robot arm connected to the spout gripping device, adapted to transport the spout gripping device, a controller adapted to control the at least one pick and place robot unit on the basis of a stacking program and the observations from the camera system.

2. Pouch collection robot system according to claim 1, further comprising a storage rail retainer, retaining at least one row of storage rails, wherein the storage rails are each provided with a longitudinal slot, wherein the slots in the rails of one row are parallel and vertically orientated and all face the same direction.

3. Pouch collection robot system according to claim 2, wherein the storage rails in the storage rail retainer are provided close to one another, allowing the pouches of the non-filled spouted pouches to overlap at their sides.

4. Pouch collection robot system according to claim 2, wherein the storage rail retainer is provided with a lower rail holder and an upper rail holder, adapted to hold one or more storage rails in the storage rail retainer.

5. Pouch collection robot system according to claim 4, wherein the upper rail holder is provided with multiple spout receiving heads, provided in alignment with and above the upper end of a storage rail, wherein the gripper is adapted to place the spout of a non-oriented non-filled spouted pouch into the spout receiving head.

6. Pouch collection robot system according to claim 5, wherein each spout receiving head is provided with a spring loaded spout retainer which is adapted to retain the spout in the spout receiving head, allowing the gripper to move away from the spout receiving head without the spouted pouch.

7. Pouch collection robot system according to claim 2, wherein the retainer is embodied as a storage cassette comprising two opposite rows of storage rails, wherein the slots in the rails of one row are substantially opposite the slots of the rails of the opposite row, and wherein the opposed rows of storage rails are provided close to one another, allowing the pouches of said two spouted pouches to overlap at their ends opposite the spouts.

8. Pouch collection robot system according to claim 7, wherein the storage cassette comprises an upper and a lower cassette part, wherein the lower cassette part is provided with a lower rail holder and the upper cassette part is provided with an upper rail holder, adapted to hold one or more rails in the storage cassette, and wherein the upper cassette part is removable from the lower cassette part while the lower cassette part maintains the support of the multiple storage rails.

9. Pouch collection robot system according to claim 8, wherein further an unloading device is provided that is adapted to remove the upper cassette part from the lower cassette part after the multiple storage rails have been stacked with spouted pouches, thereby exposing upper parts of the multiple storage rails with the stacked spouted pouches.

10. Pouch collection robot system according to claim 9, and wherein at a bottom part thereof the unloading device is provided with a horizontal rail engaging surface that is movable in an upward direction, to engage the lower ends of one or more storage rails, and push the storage rails upwards and thereby remove them from the lower rail holders of the lower cassette part, thereby releasing the multiple storage rails with the stacked spouted pouches from the lower cassette part, to form an assembly of stacked spouted pouches and multiple storage rails.

11. Pouch collection robot system according to claim 7, further comprising a press device that is adapted to be brought into alignment with at least one of the multiple storage rails, and that is adapted to press the non-filled spouted pouch that is placed into alignment with the storage rail into the storage rail, wherein the storage rails are arranged parallel and side by side in a row, wherein the spout gripping device further comprises one or more pressing rods, allowing the spout gripping device to substantially simultaneously place a spouted pouch into a first storage rail and press a spouted pouch that has previously been placed into alignment with a second storage rail by the pressing rod into the second storage rail.

12. Pouch collection robot system according to claim 2, wherein the system further comprises:
multiple docking stations positioned adjacent the conveyor, each one being provided to dock a storage rail retainer; and
a trolley adapted to move the storage rail retainer to and from a docking station.

13. Pouch collection robot system according to claim 1, further comprising a press device that is adapted to be brought into alignment with at least one of the multiple storage rails, and that is adapted to press the non-filled spouted pouch that is placed into alignment with the storage rail into the storage rail.

14. Pouch collection robot system according to claim 1, wherein the storage rails are arranged parallel and side by side in a row.

15. Method for the assembly and collection of non-filled spouted pouches wherein use is made of a system according to claim 1, comprising the following steps:
conveying said two non-oriented non-filled spouted pouches onto the conveyor,
operating the camera system to perform visual observations on the conveyor, identifying said two non-oriented non-filled spouted pouches,
on the basis of the stacking program and the observations from the camera system, operating the controller to control the robot unit to:
pick up said two non-oriented non-filled spouted pouches;
transport the picked two non-filled spouted pouches from the conveyor into alignment with one of the multiple storage rails,
placing the two oriented non-filled spouted pouches into the storage rail.

\* \* \* \* \*